US010711860B2

(12) United States Patent
Ashiba

(10) Patent No.: US 10,711,860 B2
(45) Date of Patent: Jul. 14, 2020

(54) FLUIDIC DAMPER

(71) Applicant: HITACHI AUTOMOTIVE SYSTEMS, LTD., Hitachinaka-shi, Ibaraki (JP)

(72) Inventor: Masahiro Ashiba, Naka-gun (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/546,054

(22) PCT Filed: Jan. 20, 2016

(86) PCT No.: PCT/JP2016/051537
§ 371 (c)(1),
(2) Date: Jul. 25, 2017

(87) PCT Pub. No.: WO2016/121593
PCT Pub. Date: Aug. 4, 2016

(65) Prior Publication Data
US 2018/0010665 A1  Jan. 11, 2018

(30) Foreign Application Priority Data
Jan. 30, 2015 (JP) .................. 2015-017750

(51) Int. Cl.
*F16F 9/19* (2006.01)
*F16F 9/34* (2006.01)
(Continued)

(52) U.S. Cl.
CPC ............. *F16F 9/19* (2013.01); *F16F 9/061* (2013.01); *F16F 9/3214* (2013.01); *F16F 9/348* (2013.01); *F16F 9/3481* (2013.01)

(58) Field of Classification Search
CPC .... F16F 9/18; F16F 9/19; F16F 9/3214; F16F 9/348; F16F 9/3481; F16F 9/3485; F16F 9/3488; F16F 9/34
See application file for complete search history.

(56) References Cited

U.S. PATENT DOCUMENTS 5,072,812 A * 12/1991 Imaizumi .............. F16F 9/3405
137/493.9
5,404,973 A * 4/1995 Katoh ..................... F16F 9/468
188/266.3
(Continued)

FOREIGN PATENT DOCUMENTS

GB 1521943 8/1978
GB 2124328 A * 2/1984 .............. F16F 9/348
(Continued)

OTHER PUBLICATIONS

Translation of JP 5-231460 A. (Year: 1993).*

*Primary Examiner* — Thomas J Williams
(74) *Attorney, Agent, or Firm* — Mattingly & Malur, PC

(57) ABSTRACT

The first piston body includes a first passage which has a first opening that opens to the first chamber on the coupling surface with the second piston body and extends in the axial direction, and a second passage which has a second opening on the coupling surface, extends in the axial direction and has a third opening that opens to the second chamber, the second piston body is coupled to the first piston body to prevent direct communication with the first chamber of the second opening, the second opening has an inner opening portion that opens further inward in the radial direction than the first opening, and the inner opening portion communicates with a third passage formed in the second piston body.

6 Claims, 9 Drawing Sheets

(51) Int. Cl.
    *F16F 9/348*     (2006.01)
    *F16F 9/06*     (2006.01)
    *F16F 9/32*     (2006.01)

(56) References Cited

U.S. PATENT DOCUMENTS

| | | | |
|---|---|---|---|
| 6,460,664 B1 | 10/2002 | Steed et al. | |
| 2011/0209957 A1 | 9/2011 | Ashiba | |
| 2013/0168195 A1* | 7/2013 | Park | F16F 9/3214 188/322.22 |
| 2015/0008083 A1 | 1/2015 | Yamada | |
| 2015/0034437 A1* | 2/2015 | Yamada | F16F 9/3481 188/322.15 |
| 2015/0152936 A1* | 6/2015 | Kim | F16F 9/3485 188/313 |
| 2015/0192184 A1* | 7/2015 | Yamada | F16F 9/3481 188/322.15 |

FOREIGN PATENT DOCUMENTS

| | | | |
|---|---|---|---|
| JP | 52-129886 | 10/1977 | |
| JP | 02-113142 | 4/1990 | |
| JP | 05-248473 | 9/1993 | |
| JP | 05231460 A * | 9/1993 | |
| JP | 2001050328 A * | 2/2001 | |
| JP | 2005-188602 | 7/2005 | |
| JP | 2011-033108 | 2/2011 | |
| JP | 2011-179550 | 9/2011 | |
| JP | 2012-127414 | 7/2012 | |
| JP | 2013-190044 | 9/2013 | |
| WO | WO-2013136911 A1 * | 9/2013 | F16F 9/3481 |

* cited by examiner

FLUIDIC DAMPER

TECHNICAL FIELD

The present invention relates to a fluidic damper.

This application is the U.S. national phase of International Application No. PCT/JP2016/051537 filed on Jan. 20, 2016 which designated the U.S. and claims priority to Japanese Patent Application No. 2015-17750, filed Jan. 30, 2015, the entire contents of each of which are incorporated herein by reference.

BACKGROUND ART

As a damper, there is a damper in which a piston includes a plurality of piston bodies.

CITATION LIST

Patent Literature

[Patent Literature 1]
Japanese Unexamined Patent Application, First Publication No. 2005-188602
[Patent Literature 2]
U.S. Pat. No. 6,460,664
[Patent Literature 3]
Japanese Unexamined Patent Application, First Publication No. H02-113142

SUMMARY OF INVENTION

Technical Problem

Cost reduction of dampers is required.
The present invention provides a fluidic damper capable of reducing cost.

Solution to Problem

According to a first aspect of the present invention, a fluidic damper includes a cylinder in which a working fluid is sealed; a piston slidably provided in the cylinder to partition the interior of the cylinder into a first chamber and a second chamber; and a piston rod connected to the piston and having one end extending to the outside of the cylinder. The piston includes a first piston body and a second piston body coupled to each other at a coupling surface. Damping force generating mechanisms are disposed on the second chamber side of the first piston body and the first chamber side of the second piston body. The first piston body includes a first passage which has a first opening that opens to the first chamber in the coupling surface with the second piston body and extends in the axial direction, and a second passage which has a second opening on the coupling surface with the second piston body, extends in the axial direction and has a third opening that opens to the second chamber. The second piston body is coupled to the first piston body to prevent direct communication with the first chamber of the second opening. The second opening has an inner opening portion that opens further inward in the radial direction than the first opening, and the inner opening portion communicates with a third passage formed in the second piston body.

According to a second aspect of the present invention, the first opening and the second opening may have a portion which opens on the same circle.

According to a third aspect of the present invention, a first annular passage may be formed further inward in the radial direction than the first opening of the first piston body and at a position communicating with the second opening.

According to a fourth aspect of the present invention, a second annular passage may be formed at a position communicating with the inner opening portion of the second piston body.

According to a fifth aspect of the present invention, a third piston body having a fourth passage communicating with the first passage may be provided on the second chamber side of the first piston body.

According to a sixth aspect of the present invention, an outer shape of the second piston body may be circular.

According to a seventh aspect of the present invention, a plurality of first openings and second openings may be provided, and the first openings and the second openings may be alternately disposed.

Advantageous Effects of Invention

According to the aforementioned fluidic damper, it is possible to reduce the cost of the fluidic damper.

DESCRIPTION OF EMBODIMENTS

First Embodiment

A fluidic damper according to a first embodiment of the present invention will be described below with reference to FIGS. 1 to 3.

Figure 1:
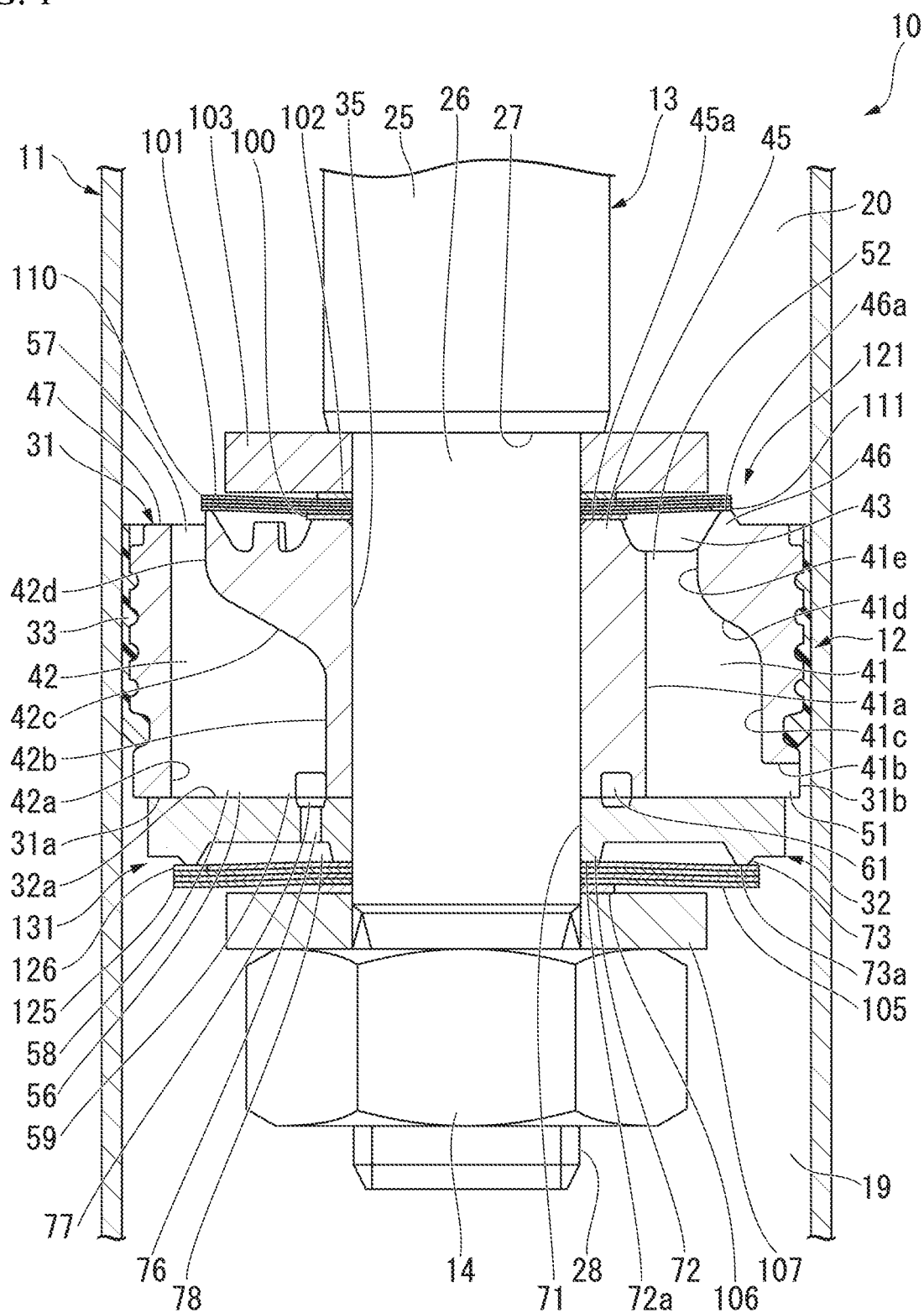
FIG. 1 is a partial cross-sectional view of a fluidic damper according to a first embodiment of the present invention.

As illustrated in FIG. 1, a fluidic damper 10 according to a first embodiment has a cylinder 11 in which a working fluid such as a liquid or a gas is sealed. The cylinder 11 has a bottomed tubular shape, which is not illustrated but is open at one end side (upper side in FIG. 1) and closed at the other end side (lower side in FIG. 1). A piston 12 is slidably fitted in the cylinder 11.

A piston rod 13 is inserted into the cylinder 11. One end side (the upper side in FIG. 1) of the piston rod 13 extends to the outside of the cylinder 11, and the other end side thereof is inserted into the cylinder 11. The piston 12 is connected to the other end portion of the piston rod 13 by a nut 14. Although it is not illustrated, a rod guide and an oil seal are mounted in an opening of the cylinder 11. One end side of the piston rod 13 is inserted through the rod guide and the oil seal and extends to the outside. The piston 12 divides the interior of the cylinder 11 into a first chamber 19 of a bottom side (not illustrated) (lower side in FIG. 1) of the cylinder 11 and a second chamber 20 of the side into which the piston rod 13 extends (upper side in FIG. 1).

The piston rod 13 has a main shaft portion 25, and an attachment shaft portion 26 located at the inner end portion of the cylinder 11 and having a smaller diameter than that of the main shaft portion 25. As a result, a stepped portion 27 along a direction orthogonal to an axis is formed in the main shaft portion 25 at the end portion on the attachment shaft portion 26 side. On the attachment shaft portion 26, a male screw 28 for the aforementioned nut 14 to be screwed is formed in a predetermined range on the side opposite to the main shaft portion 25.

The piston 12 has a substantially disc-shaped piston body 31 (first piston body), and a substantially disc-shaped piston body 32 (second piston body). The piston body 32 is disposed on the side close to the first chamber 19 of the piston body 31, and is thinner in the axial direction than the piston body 31. In the piston bodies 31 and 32, a coupling surface 31a and a coupling surface 32a are coupled in a surface alignment state. The coupling surface 31a is an end surface of the piston body 31 close to the piston body 32 and is a surface orthogonal to a central axis of the piston body 31. The coupling surface 32a is an end surface of the piston body 32 close to the piston body 31 and is a surface orthogonal to the central axis of the piston body 32. That is, the piston 12 includes the piston bodies 31 and 32 coupled to each other at the coupling surfaces 31a and 32a. The piston bodies 31 and 32 are integrally formed by sintering.

The piston 12 has a ring-shaped sliding contact member 33. The sliding contact member 33 is mounted on an outer circumferential surface 31b of the piston body 31 and comes into slide-contact with the inner circumferential surface of the cylinder 11. The sliding contact member 33 is mounted to be slightly displaced to the side opposite to the coupling surface 31a in the axial direction of the piston body 31. A part of the outer circumferential surface 31b of the sliding contact member 33 close to the coupling surface 31a is exposed into the first chamber 19.

In the center of the piston body 31 in the radial direction, an insertion hole 35 is formed to penetrate in the axial direction. The insertion hole 35 allows the attachment shaft portion 26 of the piston rod 13 to be inserted with no gap. Further, a passage 41 (a first passage), a passage 42 (a second passage), and an annular passage 43 are formed in the piston body 31. The passage 41 extends in the axial direction of the piston body 31 outside the insertion hole 35 in the radial direction. The passage 42 extends in the axial direction of the piston body 31 outside the insertion hole 35 in the radial direction. The annular passage 43 extends over the entire circumference of the piston body 31 at the end portion opposite to the axial coupling surface 31a.

By formation of the annular passage 43, an inner seat 45 and an outer seat 46 on the outside of the inner seat 45 are formed at the end portion on the side opposite to the coupling surface 31a in the axial direction of the piston body 31. The inner seat 45 is located inside the annular passage 43 in the radial direction of the piston body 31. The outer seat 46 is located outside the annular passage 43 in the radial direction of the piston body 31. Both the inner seat 45 and the outer seat 46 are formed to protrude in the axial direction of the piston body 31. In other words, the annular passage 43 is formed between the inner seat 45 and the outer seat 46 in the radial direction of the piston body 31. A stepped portion 47 is formed at an end portion of the piston body 31 on the side opposite to the coupling surface 31a in the axial direction. The stepped portion 47 is formed outside the outer seat 46 in the radial direction. The stepped portion 47 has a stepped shape to be closer to the coupling surface 31a than the outer seat 46 in the axial direction.

Figure 2:
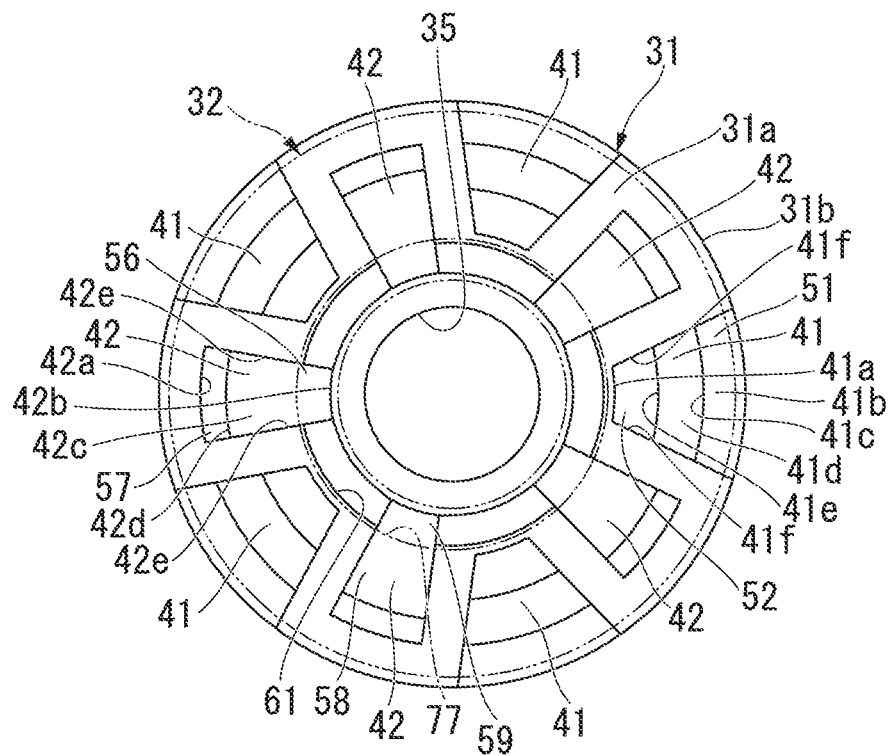
FIG. 2 is a view illustrating a piston body (first piston body) of the fluidic damper of the first embodiment according to the present invention, as viewed from a coupling surface side.
Figure 3:
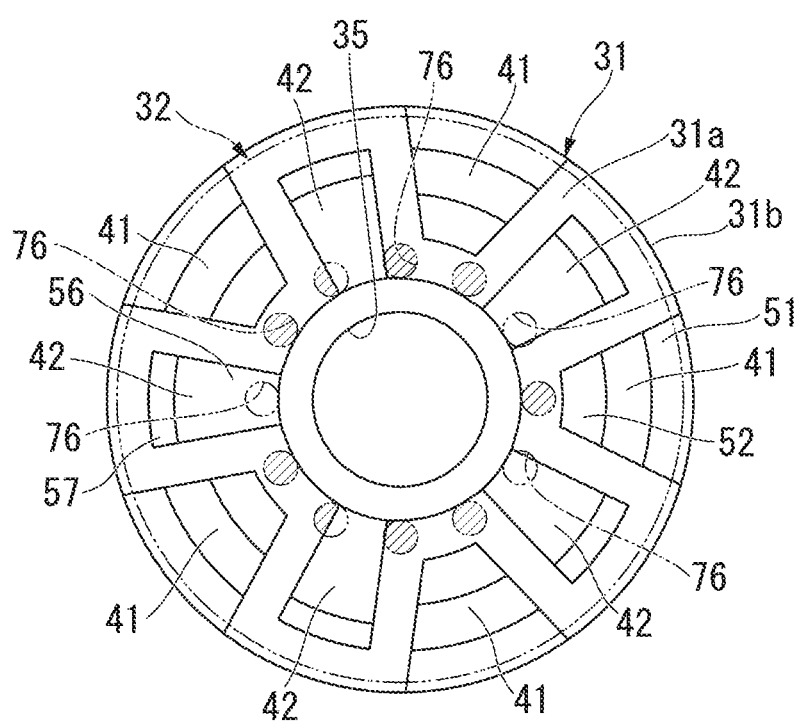
FIG. 3 is a view illustrating a modified example of a piston body (first piston body) of a fluidic damper according to a first embodiment of the present invention, as viewed from the coupling surface side.

As illustrated in FIG. 2, a plurality of passages 41 are formed on the piston body 31 at intervals in the circumferential direction. A plurality of passages 42 are also formed on the piston body 31 at intervals in the circumferential direction. The passage 41 and the passage 42 are alternately arranged in the circumferential direction of the piston body 31. The annular passage 43 illustrated in FIG. 1 is formed to connect all the plurality of passages 41.

As illustrated in FIG. 1, the passage 41 of the piston body 31 has an opening 51 (first opening) and an opening 52. The opening 51 opens to a coupling surface 31a with the piston body 32. The opening 52 opens to the bottom position of the annular passage 43. The opening 51 also opens to the outer circumferential surface 31b of the piston body 31 which is not covered with the sliding contact member 33. The opening 51 continuously opens from the coupling surface 31a to the outer circumferential surface 31b. The opening 51 always opens to the first chamber 19.

In the passage 41, an inner end surface 41a which is the inner end side of the piston body 31 in the radial direction is formed. The inner end surface 41a is formed at a fixed position in the radial direction and the circumferential direction from the opening 51 to the opening 52. Accordingly, the passage 41 has a portion which linearly extends in the axial direction of the piston body 31 from the opening 51 to the opening 52. The passage 41 has a radial surface 41b, an axial surface 41c, an inclined surface 41d, and an axial surface 41e on the outer end side in the radial direction of the piston body 31. The radial surface 41b is located close to the coupling surface 31a and is parallel to the coupling surface 31a. The axial surface 41c extends from the inner end edge portion of the radial surface 41b in the radial direction of the piston body 31 toward the annular passage 43 along the axial direction of the piston body 31. The inclined surface 41d extends toward the annular passage 43 from the end edge portion on the opposite side to the radial surface 41b of the axial surface 41c. The inclined surface 41d is inclined to be positioned on the inner side in the radial direction of the piston body 31 toward the annular passage 43. The axial surface 41e extends toward the annular passage 43 from the end edge portion of the inclined surface 41d on the side opposite to the axial surface 41c in the axial direction of the piston body 31. The inner end surface 41a and the axial surface 41e extend to the bottom position of the annular passage 43 to form the opening 52.

As illustrated in FIG. 2, the inner end surface 41a, the axial surface 41c, and the axial surface 41e have a shape of a part of a cylinder centered on the central axis of the piston body 31. The passage 41 has a pair of opposing surfaces 41f extending in the radial direction of the piston body 31 and facing each other in the circumferential direction of the piston body 31. The passage 41 is formed by an inner end surface 41*a*, the radial surface 41*b*, the axial surface 41*c*, the inclined surface 41*d*, the axial surface 41*e*, and a pair of opposing surfaces 41*f*. The inner end surface 41*a*, the radial surface 41*b*, and the pair of opposing surfaces 41*f* form the opening 51, and the inner end surface 41*a*, the axial surface 41*e*, and the pair of opposing surfaces 41*f* form the opening 52. As illustrated in FIG. 1, the width of the opening 51 from the inner end surface 41*a* to the outer circumferential surface 31*b* in the radial direction of the piston body 31 is wider than the width of the opening 52 from the inner end surface 41*a* to the axial surface 41*e*.

The passage 42 of the piston body 31 has an opening 56 (a second opening) and an opening 57 (a third opening). The opening 56 is opened to the coupling surface 31*a* with the piston body 32. The opening 57 is always opened to the second chamber 20 by being opened at the position of the stepped portion 47 of the piston body 31. The opening 56 is opened only to the coupling surface 31*a* of the piston body 31 and is not opened to the outer circumferential surface 31*b*.

The passage 42 is formed with an outer end surface 42*a* which is the outer end side in the radial direction of the piston body 31. The outer end surface 42*a* is formed at a fixed position in the radial direction and the circumferential direction from the opening 56 to the opening 57. Thus, the passage 42 has a portion which linearly extends in the axial direction of the piston body 31 from the opening 56 to the opening 57. The passage 42 has an axial surface 42*b*, an inclined surface 42*c*, and an axial surface 42*d* on the inner end side of the piston body 31 in the radial direction. The axial surface 42*b* extends from the coupling surface 31*a* toward the stepped portion 47 in the axial direction of the piston body 31. The inclined surface 42*c* extends from the end edge portion of the axial surface 42*b* on the opposite side of the coupling surface 31*a* toward the stepped portion 47. The inclined surface 42*c* is inclined to be positioned closer to the outer side of the piston body 31 in the radial direction as being away from the coupling surface 31*a*. The axial surface 42*d* extends from the end edge portion of the inclined surface 42*c* on the side opposite to the axial surface 42*b* to the stepped portion 47 in the axial direction of the piston body 31.

As illustrated in FIG. 2, the outer end surface 42*a*, the axial surface 42*b*, and the axial surface 42*d* have a shape of a part of a cylinder centered on the central axis of the piston body 31. The passage 42 has a pair of opposing surfaces 42*e* that extend in the radial direction of the piston body 31 and face each other in the circumferential direction of the piston body 31. The passage 42 is formed by the outer end surface 42*a*, the axial surface 42*b*, the inclined surface 42*c*, the axial surface 42*d*, and a pair of opposing surfaces 42*e*. The outer end surface 42*a*, the axial surface 42*b*, and the pair of opposing surfaces 42*e* form the opening 56, and the outer end surface 42*a*, the axial surface 42*d*, and the pair of opposing surfaces 42*e* form the opening 57. As illustrated in FIG. 1, the width of the opening 56 from the outer end surface 42*a* to the axial surface 42*b* in the radial direction of the piston body 31 is wider than the width of the opening 57 from the outer end surface 42*a* to the axial surface 42*d*.

In the radial direction of the piston body 31, the position of the innermost axial surface 42*b* of the opening 56 is located further inward (toward the center of the piston body 31) than the position of the innermost inner end surface 41*a* of the passage 41. In other words, the shortest distance between the center of the piston body 31 and the opening 51 is larger than the shortest distance between the center of the piston body 31 and the opening 56. The position of the outer circumferential surface 31*b* which is the outer end position of the opening 51 which is the outermost position of the passage 41 in the radial direction of the piston body 31 is located outside the position of the outermost outer end surface 42*a* of the passage 42.

As described above, the shortest distance between the center of the piston body 31 and the opening 51 (the distance between the center of the piston body 31 and the inner end surface 41*a*) is larger than the shortest distance between the center of the piston body 31 and the opening 56 (the distance between the center of the piston body 31 and the axial surface 42*b*). Further, the longest distance between the center of the piston body 31 and the opening 56 (the distance between the center of the piston body 31 and the outer end surface 42*a*) is larger than the shortest distance between the center of the piston body 31 and the opening 51. As a result, the opening 51 of the passage 41 and the opening 56 of the passage 42 have a portion that is opened on the same circle with a fixed width centered on the center of the piston body 31. A portion of the opening 56 of the passage 42 that is opened on the same circle as the opening 51 of the passage 41 is the main opening portion 58. The main opening portion 58 is a portion on the outer side from the intermediate portion in the radial direction of the piston body 31 in the opening 56.

The position of the axial surface 42*b* of the opening 56 which is at the innermost position of the passage 42 in the radial direction of the piston body 31 is located inside the position of the innermost inner end surface 41*a* of the passage 41. Accordingly, the opening 56 has the main opening portion 58 that opens in the same range as the opening 51 in the radial direction of the piston body 31, and the inner opening portion 59 which opens to the inner side of the main opening portion 58 in the radial direction, that is, to the inner side of the opening 51 in the radial direction. The inner opening portion 59 is in a range inside the piston body 31 in the radial direction of the opening 56.

An annular passage 61 (first annular passage) is formed on the radially inner side of the opening 51 and on the radially outer side of the insertion hole 35 on the coupling surface 31*a* side of the piston body 31. The annular passage 61 opens to the coupling surface 31*a* and is formed to traverse the opening 56 in a circumferential direction at a position of the passage 42 communicating with the opening 56 as illustrated in FIG. 2. In other words, the annular passage 61 is formed at a position between the insertion hole 35 of the piston body 31 and the inner end surface 41*a*. The annular passage 61 is intermittently formed at a position other than the opening 56 on the same circle centered on the center of the piston body 31. As illustrated in FIG. 1, the annular passage 61 is opened to the inner end position of the opening 56 in the radial direction of the piston body 31, that is, the inner end position of the inner opening portion 59.

The piston body 32 has a circular outer shape, and the insertion hole 71 is formed at the center in the radial direction thereof to penetrate in the axial direction. The insertion hole 71 allows the attachment shaft portion 26 of the piston rod 13 to be inserted with no gap. On the piston body 32, an inner seat 72 and an outer seat 73 are formed on the side opposite to the piston body 31. The inner seat 72 protrudes in the axial direction of the piston body 32 outside the insertion hole 71 in the radial direction of the piston body 32. The outer seat 73 protrudes in the axial direction of the piston body 32 outside the inner seat 72 in the radial direction of the piston body 32. The outer seat 73 may have a circular shape or a petal shape. The inner seat 72 forms an annular shape that surrounds the insertion hole 71, and in detail, the inner seat 72 has an annular shape matching the center with the insertion hole 71. The outer seat 73 forms an annular shape surrounding the inner seat 72, and in detail, the outer seat 73 has an annular shape matching the center with the inner seat 72. An annular passage 78 recessed in the axial direction of the piston body 32 is formed between the inner seat 72 and the outer seat 73.

The piston bodies 31 and 32 are fitted to the attachment shaft portion 26 of the piston rod 13 in the insertion holes 35 and 71 to bring the coupling surfaces 31a and 32a into a surface alignment state. Then, in the radial direction, the outer circumferential position of the piston body 32 is disposed further outward than the outer end position of the opening 56 of the passage 42. This allows the piston body 32 to be coupled to the piston body 31 to prevent direct communication between the opening 56 of the passage 42 and the first chamber 19. Even when the piston body 32 is coupled to the piston body 31 in this way, since the end portion on the side of the coupling surface 31a has a shape that extends radially outward, the opening 51 of the passage 41 of the piston body 31 always opens to the first chamber 19.

In the piston body 32, a passage 76 (third passage) and an annular passage 77 (second annular passage) are formed at a position near the inner seat 72 between the inner seat 72 and the outer seat 73. A plurality of (only one illustrated in FIG. 1) passages 76 are provided to extend in the axial direction of the piston body 32. The annular passage 77 extends over the entire circumference of the piston body 32 at the position of the coupling surface 32a to connect the plurality of passages 76. The plurality of passages 76 are formed at equal intervals in the circumferential direction of the piston body 32, at positions equidistant from the center of the piston body 32. The annular passage 77 has an annular shape centered on the center of the piston body 32.

The plurality of passages 76 and annular passages 77 are disposed at the positions of the inner opening portion 59 of the passage 42 and the annular passage 61 in the radial direction of the piston bodies 31 and 32 when the piston bodies 31 and 32 are in the coupled state. Therefore, the plurality of passages 76 and annular passages 77 always communicate with the inner opening portion 59 and the annular passage 61.

On the side of the second chamber 20 of the piston body 31 in the axial direction, a spacer 100, a disc 101, a spacer 102, and a regulating member 103 are provided in order from the side of the piston body 31 in the axial direction. A disc 105, a spacer 106, and a regulating member 107 are provided in order from the side of the piston body 32 on the side opposite to the piston body 31 in the axial direction of the piston body 32.

The spacer 100, the disc 101, the spacer 102, the regulating member 103, the disc 105, the spacer 106 and the regulating member 107 have an annular shape, and the attachment shaft portion 26 of the piston rod 13 is inserted into the inner circumferential portion with no gap. The spacer 106 is a component common to the spacer 102, and the regulating member 107 is a component common to the regulating member 103.

The attachment shaft portion 26 of the piston rod 13 is inserted through the inner circumferential portion of the regulating member 103, the inner circumferential portion of the spacer 102, the inner circumferential portion of the disc 101, the inner circumferential portion of the spacer 100, the insertion hole 35 of the piston body 31, the insertion hole 71 of the piston body 32, the inner circumferential portion of the disc 105, the inner circumferential portion of the spacer 106, and the inner circumferential portion of the regulating member 107. In this state, the nut 14 is screwed onto the male screw 28 of the attachment shaft portion 26. Then, the regulating member 103, the spacer 102, the disc 101, the spacer 100, the piston body 31, the piston body 32, the disc 105, the spacer 106 and the regulating member 107 are laminated while the movement in the radial direction is regulated by the attachment shaft portion 26. In the laminated state, these elements are sandwiched between the stepped portion 27 of the piston rod 13 and the nut 14. At this time, only the inner circumferential side of each of the disc 101 and the disc 105 is clamped so as not to move in the axial direction with respect to the piston rod 13.

The outer diameter of the spacer 100 is slightly larger than the outer diameter of the seat surface 45a of the inner seat 45. The outer diameter of the disc 101 is slightly larger than the outer diameter of the seat surface 46a of the outer seat 46 and covers the annular passage 43 to close it. The disc 101 is formed by laminating a plurality of disc-shaped unit discs 110 having the same diameter. A fixed orifice 111, which brings the annular passage 43 in constant communication with the second chamber 20, is formed in the unit disc 110 abutting on the seat surface 46a among the unit discs 110. In a neutral state before assembly with the piston rod 13, the unit disc 110 has a flat shape, that is, a flat plate shape in which each of the front and back surfaces is located at a constant position in the axial direction, and thus the disc 101 similarly has a flat shape, that is, a flat plate shape. The outer diameter of the spacer 102 is slightly smaller than the outer diameter of the seat surface 45a of the inner seat 45. The outer diameter of the regulating member 103 is slightly smaller than the inner diameter of the seat surface 46a of the outer seat 46.

The tip height positions in the protruding direction of the inner seat 45 and the outer seat 46 formed on the second chamber 20 side of the piston body 31 are set such that, when the protruding direction is defined as a positive direction, the tip height of the outer seat 46 in the protruding direction is slightly higher than the tip height position of the inner seat 45 in the protruding direction. That is, the height position in the protruding direction of the seat surface 46a at the tip of the outer seat 46 in the protruding direction is higher than the height position in the protruding direction of the seat surface 45a at the tip of the inner seat 45 in the protruding direction. More specifically, the height position of the seat surface 46a of the outer seat 46 in the protruding direction is higher than the height position of the surface on the side opposite to the seat surface 45a of the spacer 100 abutting on the seat surface 45a of the inner seat 45.

The disc 101 is assembled with the piston rod 13 to be pressed against the spacer 100 abutting on the seat surface 45a of the inner seat 45. When the disc 101 is in a non-operating state in which there is no pressure difference between the first chamber 19 and the second chamber 20, the disc 101 is seated on the seat surface 46a of the outer seat 46 of the piston body 31 to close the annular passage 43 and the plurality of passages 41 provided in the piston body 31. In this state, the disc 101 is slightly deformed so that the outer circumferential side thereof is located on the side opposite to the piston body 32 in the axial direction compared to the inner circumferential side.

When the piston rod 13 moves to a compression side which increases the amount of advancement into the cylinder 11, the pressure of the first chamber 19 becomes higher than the pressure of the second chamber 20 due to the piston 12 moving together with the piston rod 13. Then, the pressure is introduced into the plurality of passages 41 from the constantly open opening 51 and acts on the disc 101 via the annular passage 43. Then, the disc 101 is separated from the outer seat 46 to open the annular passage 43 and the plurality of passages 41. As a result, the working fluid flows from the first chamber 19 to the second chamber 20 at a flow rate according to the valve opening amount of the disc 101 and the outer seat 46 via the plurality of passages 41 and the annular passage 43. That is, when the piston rod 13 moves to the compression side and the piston 12 slides inside the cylinder 11 together with the piston rod 13, the working fluid flows from the first chamber 19 to the second chamber 20 in the annular passage 43 and the plurality of passages 41 by the sliding movement.

The annular outer seat 46 protruding from the piston body 31 to surround the annular passage 43 and the disc 101 opening and closing the second chamber 20 side of the annular passage 43 constitute a damping force generating mechanism 121 of the compression side. The damping force generating mechanism 121 is provided for the annular passage 43 and the plurality of passages 41 to suppress the flow of the working fluid and generate a damping force. The damping force generating mechanism 121 is disposed on the second chamber 20 side of the piston body 31.

The outer diameter of the disc 105 is larger than the outer diameter of the seat surface 73a on the protruding tip side of the outer seat 73 and covers the annular passage 78 to close it. The disc 105 is formed by laminating a plurality of disc-like unit discs 125 having the same diameter. Among them, the unit disc 125 abutting on the seat surface 73a is formed with a fixed orifice 126 which brings the annular passage 78 in constant communication with the first chamber 19A. In a neutral state before assembly with the piston rod 13, the unit disc 125 has a flat shape, that is, a flat plate shape in which each of the front and back surfaces is located at a fixed position in the axial direction, and thus the disc 105 similarly has a flat shape, that is, a flat plate shape.

The spacer 106 has an annular shape in which an outer diameter thereof is slightly larger than the outer diameter of the seat surface 72a of the inner seat 72. The regulating member 107 has an annular shape in which an outside diameter thereof is smaller than the inner diameter of the seat surface 73a of the outer seat 73.

When the protruding direction (the downward direction in FIG. 1) is defined as the positive direction, the tip height positions in the protruding direction of the inner seat 72 and the outer seat 73 are set such that the tip height position of the outer seat 73 in the protruding direction is higher than the tip height position of the inner seat 72 in the protruding direction. That is, the height position in the protruding direction of the seat surface 73a at the tip of the outer seat 73 in the protruding direction is higher than the height position in the protruding direction of the seat surface 72a at the tip of the inner seat 72 in the protruding direction.

When the disc 105 and other parts are assembled with the piston rod 13, the disc 105 is pressed against the inner seat 72 and placed on the outer seat 73. In this state, the disc 105 is slightly deformed so that the outer circumferential side is separated from the piston body 31 in the axial direction compared to the inner circumferential side.

When the disc 105 is in a non-operating state in which there is no pressure difference between the first chamber 19 and the second chamber 20, the disc 105 is seated on the seat surface 73a of the outer seat 73 of the piston body 32. In this state, the disc 105 closes the annular passage 78 provided in the piston body 32, the plurality of passages 76 and the annular passage 77, and the annular passage 61 and the plurality of passage 42 provided in the piston body 31.

When the piston rod 13 moves to the extension side which increases the protrusion amount from the cylinder 11, the pressure of the second chamber 20 becomes higher than the pressure of the first chamber 19 due to the piston 12 that moves together with the piston rod 13. Then, the pressure is introduced into the plurality of passages 42 from the constantly open opening 57 and acts on the disc 105 via the annular passages 61 and 77, the plurality of passages 76 and the annular passage 78. Then, the disc 105 is separated from the outer seat 73 and opens the annular passage 78. As a result, the working fluid flows from the second chamber 20 to the first chamber 19 via a plurality of passages 42, the annular passages 61 and 77, a plurality of passages 76, and an annular passage 78 at a flow rate according to the valve opening amount of the disc 105 and the outer seat 73. That is, in the plurality of passages 42, the annular passages 61 and 77, the plurality of passages 76 and the annular passage 78, when the piston rod 13 moves to the extension side and the piston 12 slides in the cylinder 11 integrally with the piston 12, the working fluid flows from the second chamber 20 toward the first chamber 19 due to the sliding movement.

The annular outer seat 73 protruding from the piston body 32 to surround the annular passage 78 and the disc 105 opening and closing the first chamber 19 side of the annular passage 78 constitute a damping force generating mechanism 131 of the extension side. The damping force generating mechanism 131 of the extension side is provided for the plurality of passages 42, the annular passages 61 and 77, the plurality of passages 76, and the annular passage 78 to suppress the flow of the working fluid and generate the damping force. The damping force generating mechanism 131 is disposed on the side of the first chamber 19 of the piston body 32.

The above-mentioned Patent Literature 1 discloses a piston structure in which a pair of piston halves formed with passages are coupled together while the opening positions of the passages of the coupling surfaces are aligned to form a passage on the extension side and a passage on the compression side. In the piston structure, in order to align the opening positions of the passages, a circumferential positioning portion having a concave shape and a convex shape fitted with the coupling surfaces of the pair of piston halves is formed. Also, Patent Literature 2 also discloses a structure similar to that of Patent Literature 1, and although it is not described, a circumferential positioning portion is required. In a structure requiring the positioning in the circumferential direction as in Patent Literatures 1 and 2, it is necessary to perform circumferential alignment work in the assembling work, which is a cause of an increase in cost. Further, a convex portion protruding from the coupling surface may be chipped due to contact with other components, and it is difficult to apply it to an automatic component feeder, which is also a cause of an increase in cost. In Patent Literature 3, because a passage with an oblique hole is formed, positioning in the circumferential direction is unnecessary, but it is necessary to form oblique holes by cutting, resulting in an increase in cost. Further, the coupling surface of Patent Literature 3 has a structure in which a plurality of passages of either of the extension side passage and the compression side passage are provided on the same circle outside the insertion hole of the piston rod, and a plurality of other passages are provided on the same circle on the outer side thereof. Therefore, the circle formed by one passage becomes a small circle, it is difficult to secure the passage opening area, and it is difficult to respond to the request for providing a flow of a large flow rate with a small piston diameter.

In contrast, in the fluidic damper 10 of the first embodiment, the piston body 31 opens the opening 51, which is opened to the first chamber 19 of the passage 41, to the coupling surface 31a with the piston body 32, and opens the opening 56 of the passage 42 communicating with the second chamber 20 to the coupling surface 31a. The piston body 31 opens the inner opening portion 59 of the opening 56 to the inner side in the radial direction from the opening 51, thereby bringing the inner opening portion 59 in communication with the passage 76 formed in the piston body 32. Therefore, even if the piston body 31 and the piston body 32 are not positioned in the circumferential direction, it is possible to allow the passage 42 and the passage 76 to communicate with each other without communication between the passage 41 and the passage 76. Therefore, the positioning portions in the circumferential direction are not necessary for the piston bodies 31 and 32, and a positioning work in the circumferential direction is not necessary for the assembling work. In addition, since there is no need for a convex portion for positioning in the circumferential direction, it can be applied to an automatic component feeder. Further, since the passages 41 and 42 extend in the axial direction of the piston body 31, it is not necessary to form the passages by cutting, and the passages can be formed by sintering. Therefore, the cost can be reduced. In addition, since the passages 41 and 42 alternately form openings on the same circle from the outer circumference side to the inner circumference side of the coupling surface 31a, it is possible to secure a large opening area, as compared with the divided arrangement of the openings into the inner and outer circumferences as illustrated in Patent Literature 3.

Further, since the annular passage 61 is formed further inward in the radial direction than the opening 51 of the piston body 31 and at a position communicating with the opening 56, it is possible to allow the passage 42 and the passage 76 to communicate with each other, without increasing the number of the passages 76.

Further, an annular passage 77 is formed at a position communicating with the inner opening portion 59 of the piston body 32. Therefore, it is possible to allow the passage 42 and the passage 76 to communicate with each other, without increasing the number of the passages 76. Only one of the annular passage 61 and the annular passage 77 may be formed. Further, as illustrated in FIG. 3, if the number of the passages 76 is set such that one of the passages 76 communicates with the passage 42, regardless of the circumferential positional relationship between the piston bodies 31 and 32, it is also possible to eliminate the need to provide both of the annular passage 61 and the annular passages 77 (the closed range of the piston body 31 of the passage 76 is indicated by hatching in FIG. 3).

In addition, since the outer shape of the second piston body 32 is circular, manufacturing is facilitated and cost can be reduced.

Second Embodiment

Next, a second embodiment will be mainly described with reference to FIG. 4 focusing on differences from the first embodiment. The parts common to the first embodiment are denoted by the same nomenclature and the same reference numerals.

In the piston body 32 of the second embodiment, the height difference between a seat surface 72a of an inner seat 72 and the seat surface 73a of the outer seat 73 is larger than that of the first embodiment. Further, in the piston body 32 of the second embodiment, an annular intermediate seat 201 protruding in the axial direction of the piston body 32 is formed between the inner seat 72 and the outer seat 73 on the side opposite to the piston body 31. The intermediate seat 201 forms an annular shape that surrounds the inner seat 72, and in detail, the intermediate seat 201 has an annular shape in which the center matches with the inner seat 72.

Figure 4:
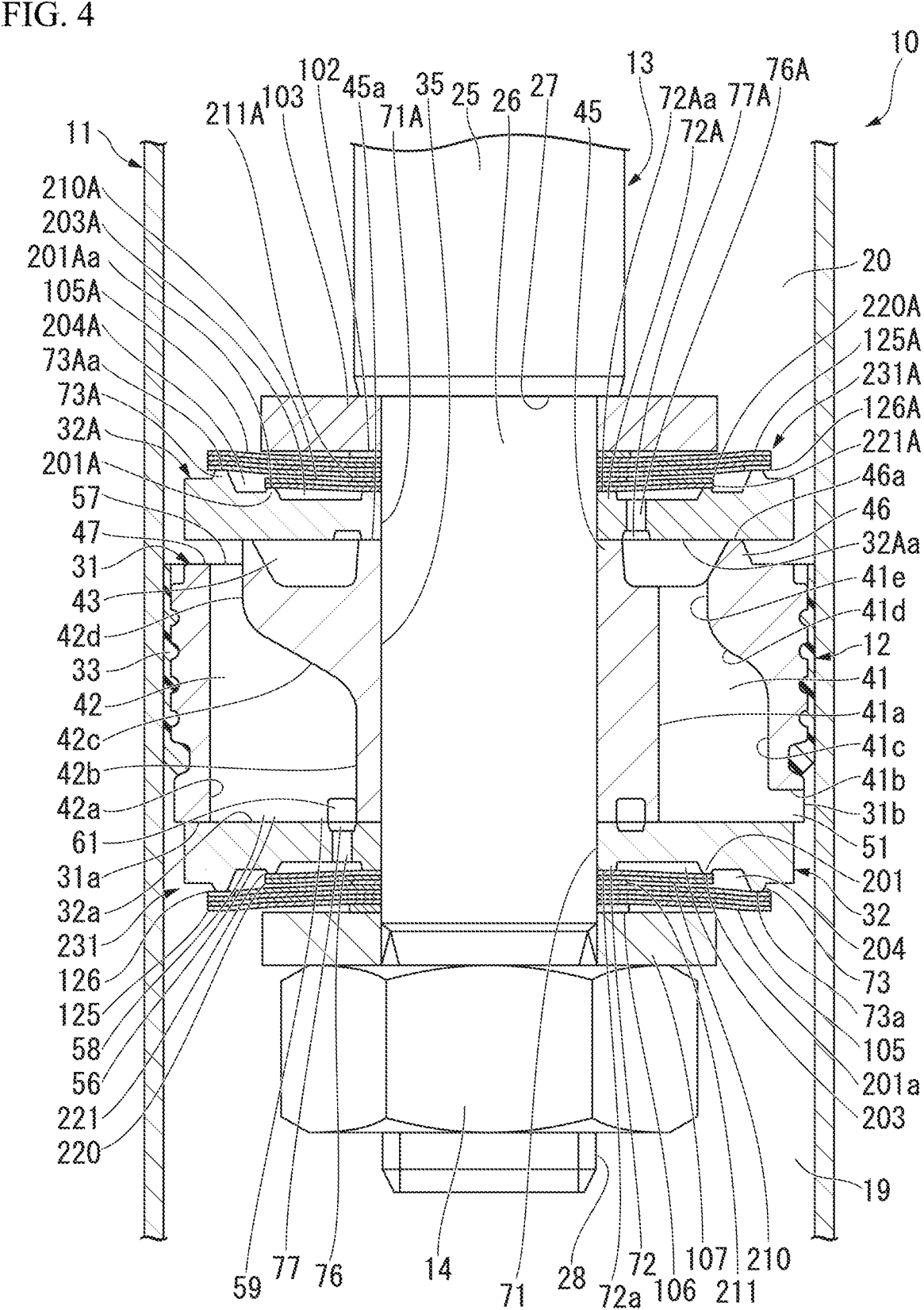
FIG. 4 is a partial cross-sectional view of a fluidic damper according to a second embodiment of the present invention.

A plurality of passages 76 (only one passage is illustrated in FIG. 4) is formed between the inner seat 72 and the intermediate seat 201 and at a position near the inner seat 72. An annular passage 203 recessed in the axial direction of the piston body 32 is formed between the inner seat 72 and the intermediate seat 201, and a plurality of passages 76 open to the annular passage 203. The inner side of the outer seat 73 in the radial direction is an annular passage 204 recessed in the axial direction of the piston body 32. The disc 105 abutting on the outer seat 73 is provided to close the annular passage 204. The fixed orifice 126 provided in the unit disc 125 abutting on the outer seat 73, among the unit discs 125 constituting the disc 105, brings the annular passage 204 in constant communication with the first chamber 19.

A disc 210 and a spacer 211 are provided between the disc 105 and the piston body 32 in order from the piston body 32 side. The disc 210 and the spacer 211 form an annular shape, and the attachment shaft portion 26 of the piston rod 13 is inserted through the inner circumferential portion thereof with no gap.

The outer diameter of the disc 210 is slightly larger than the outer diameter of the most protruding seat surface 201a of the intermediate seat 201, and covers the annular passage 203 to close it. The disc 210 is constituted by laminating a plurality of disc-like unit discs 220 having the same diameter. Among them, in the disc abutting on the seat surface 201a, a fixed orifice 221 which brings the annular passage 203 in constant communication with the annular passage 204 is formed. In a neutral state before assembly with the piston rod 13, the unit disc 220 has a flat shape, that is, a flat plate shape in which each of the front and back surfaces is located at a fixed position in the axial direction, and thus the disc 210 similarly has a flat shape, that is, a flat plate shape. The outer diameter of the spacer 211 is slightly larger than the outer diameter of the seat surface 72a of the inner seat 72.

When the protruding direction (the downward direction in FIG. 1) is defined as the positive direction, the tip height positions in the protruding direction of the inner seat 72 and the intermediate seat 201 are set such that the tip height position of the intermediate seat 201 in the protruding direction is higher than the tip height position of the inner seat 72 in the protruding direction. In other words, the height position in the protruding direction of the seat surface 201a at the tip end in the protruding direction of the intermediate seat 201 is slightly higher than the height position in the protruding direction of the seat surface 72a at the tip of the inner seat 72 in the protruding direction.

When the disc 210 and other parts are assembled with the piston rod 13, the disc 210 is pressed against the inner seat 72 and placed on the intermediate seat 201. In this state, the disc 210 is slightly inclined so that the outer circumferential side is located on the side opposite to the piston body 31 in the axial direction compared to the inner circumferential side. When the disc 105 laminated on the disc 210 via the spacer 211 is assembled with the piston rod 13 together with other parts, the disc 105 is pressed against the spacer 211 and placed on the outer seat 73. In this state, the disc 105 is slightly inclined so that the outer circumferential side is positioned on the side opposite to the piston body 31 in the axial direction compared to the inner circumferential side.

In a non-operating state in which there is no pressure difference between the first chamber 19 and the second chamber 20, the disc 105 is seated on the seat surface 73a of the outer seat 73 of the piston body 32, and the disc 210 is seated on the seat surface 201a of the intermediate seat 201 of the piston body 31. In this state, the discs 105 and 210 close the annular passages 203 and 204 provided in the piston body 32, the plurality of passages 76 and the annular passage 77, the annular passage 61 provided in the piston body 31, and the plurality of passages 42.

When the piston rod 13 moves to the extension side which increases the protrusion amount from the cylinder 11, the pressure of the second chamber 20 becomes higher than the pressure of the first chamber 19 due to the piston 12 that moves together with the piston rod 13. Then, the pressure is introduced into the plurality of passages 42 from the constantly open opening 57 and acts on the disc 210 via the annular passages 61, 77, the plurality of passages 76 and the annular passage 203. The pressure of the second chamber 20, for example, separates the disc 210 from the intermediate seat 201 and separates the disc 105 from the outer seat 73 to open the annular passages 203 and 204. Therefore, the working fluid flows from the second chamber 20 to the first chamber 19, via the plurality of passages 42, the annular passages 61 and 77, the plurality of passages 76 and the annular passages 203 and 204, at a flow rate according to the valve opening amount of the disc 210 and the intermediate seat 201 and the valve opening amount between the disc 105 and the outer seat 73. That is, when the piston rod 13 moves to the extension side and the piston 12 slides in the cylinder 11 together with the piston rod 13, in the plurality of passages 42, the annular passages 61 and 77, the plurality of passages 76 and the annular passages 203 and 204, the working fluid flows from the second chamber 20 toward the first chamber 19 by the sliding movement.

An annular intermediate seat 201 protruding from the piston body 32 to surround the annular passage 203, an annular outer seat 73 protruding from the piston body 32 to surround the annular passage 204, the disc 210 which opens and closes the annular passage 204 side of the annular passage 203, and the disc 105 which opens and closes the first chamber 19 side of the annular passage 204 constitute the damping force generating mechanism 231 of the extension side. The damping force generating mechanism 231 of the extension side is provided for the plurality of passages 42, the annular passages 61 and 77, the plurality of passages 76, and the annular passages 203 and 204 to suppress the flow of the working fluid and generate a damping force. The damping force generating mechanism 231 is disposed on the side of the first chamber 19 of the piston body 32.

In the second embodiment, the seat surface 45a of the inner seat 45 on the side of the second chamber 20 in the axial direction of the piston body 31 and the seat surface 46a of the outer seat 46 are aligned in the axial direction. Further, the annular passage 43 is widened to the inner side range in the radial direction as compared with the first embodiment.

In the second embodiment, the piston body 32A (third piston body) of a component common to the piston body 32 on the side of the first chamber 19 is made to abut on the seat surface 45a of the inner seat 45 and the seat surface 46a of the outer seat 46.

The piston body 32A has a coupling surface 32Aa similar to the coupling surface 32a, an insertion hole 71A similar to the insertion hole 71, an inner seat 72A similar to the inner seat 72, and a seat surface 72Aa similar to the seat surface 72a. The piston body 32A has an outer seat 73A similar to the outer seat 73, a seat surface 73Aa similar to the seat surface 73a, an intermediate seat 201A similar to the intermediate seat 201, and a seat surface 201Aa similar to the seat surface 201a. The piston body 32A has a plurality of passages 76A (fourth passages) similar to the plurality of passages 76, an annular passage 77A similar to the annular passage 77, an annular passage 203A similar to the annular passage 203, and an annular passage 204A similar to the annular passage 204.

In the piston body 32A, the coupling surface 32Aa is made to abut on the seat surface 45a of the inner seat 45 and the seat surface 46a of the outer seat 46 in a state in which the inner seat 72A, the outer seat 73A and the intermediate seat 201A face the side opposite to the piston body 31. The piston body 32A is coupled to the piston body 31 to prevent the direct communication with the second chamber 20 of the annular passage 43. The annular passage 77A of the piston body 32A overlaps the position of the annular passage 43 of the piston body 31 in the radial direction and always opens to the annular passage 43. The annular passage 77A and the annular passage 43 communicate with each other, irrespective of the circumferential position between the piston body 31 and the piston body 32A. Therefore, it is not necessary to position the piston body 31 and the piston body 32A in the circumferential direction.

Further, in the second embodiment, in place of the spacer 100 and the disc 101 of the first embodiment, a disc 105A which is a part common to the disc 105, a disc 210A which is a part common to the disc 210, and a spacer 211A which is a part common to the spacer 211 are provided. That is, on the side of the second chamber 20 in the axial direction of the piston body 31, the piston body 32A, the disc 210A, the spacer 211A, the disc 105A, the spacer 102, and the regulating member 103 are provided in order from the side of the piston body 31 in the axial direction.

The disc 105A has a plurality of unit discs 125A, and a fixed orifice 126A is formed in the unit disc 125A abutting on the seat surface 73Aa among them. The fixed orifice 126A permits the annular passage 204A to always communicate with the second chamber 20. The disc 210A has a plurality of unit discs 220A, and a fixed orifice 221A is formed in the unit disc 220A abutting on the seat surface 201Aa among them. The fixed orifice 221A permits the annular passages 203A and 204A to always communicate with each other.

When the disc 210A and other parts are assembled with the piston rod 13, the disc 210A is pressed against the inner seat 72A and placed on the intermediate seat 201A. In this state, the disc 210A is slightly inclined so that the outer circumferential side thereof is located on the side opposite to the piston body 31 in the axial direction compared to the inner circumferential side. Further, when the disc 105A and other parts are assembled with the piston rod 13, the disc 105A is pressed against the spacer 211A and placed on the outer seat 73A. In this state, the disc 105A is slightly inclined so that the outer circumferential side thereof is located on the side opposite to the piston body 31 in the axial direction compared to the inner circumferential side.

In a non-operating state in which there is no pressure difference between the first chamber 19 and the second chamber 20, the disc 105A is seated on the seat surface 73Aa of the outer seat 73A of the piston body 32A, and the disc 210A is seated on the seat surface 201Aa of the intermediate seat 201A of the piston body 31A. In this state, the discs 105A and 210A close the annular passages 203A and 204A provided in the piston body 32A, the plurality of passages 76A and the annular passage 77A, the annular passage 43 provided in the piston body 31 and the plurality of passages 41.

When the piston rod 13 moves to the compression side which increases the amount of advancement into the cylinder 11, the pressure of the first chamber 19 becomes higher than the pressure of the second chamber 20 due to the piston 12 moving together with the piston rod 13. Then, the pressure is introduced into the plurality of passages 41 from the constantly open opening 51 and acts on the disc 210A via the annular passages 43 and 77A, the plurality of passages 76A and the annular passage 203A. The pressure of the first chamber 19, for example, separates the disc 210A from the intermediate seat 201A, and separates the disc 105A from the outer seat 73A to open the annular passages 203A and 204A. Therefore, the working fluid flows from the first chamber 19 to the second chamber 20 via the plurality of passages 41, the annular passages 43 and 77A, the plurality of passages 76A and the annular passages 203A and 204A, at a flow rate according to the valve opening amount of the disc 210A and the intermediate seat 201A and the valve opening amount of the disc 105A and the outer seat 73A. That is, when the piston rod 13 moves to the compression side and the piston 12 slides inside the cylinder 11 integrally with the piston rod 13, in the plurality of passages 41, the annular passages 43 and 77A, the plurality of passages 76A and the annular passages 203A and 204A, the working fluid flows from the first chamber 19 to the second chamber 20 due to the sliding movement.

The annular intermediate seat 201A protruding from the piston body 32A to surround the annular passage 203A, the annular outer seat 73A protruding from the piston body 32A to surround the annular passage 204A, the disc 210A which opens and closes the annular passage 204A side of the annular passage 203A, and the disc 105A which opens and closes the second chamber 20 side of the annular passage 204A constitute a damping force generating mechanism 231A of the compression side. The damping force generating mechanism 231A of the compression side is provided for the plurality of passages 41, the annular passages 43 and 77A, the plurality of passages 76A and the annular passages 203A and 204A to suppress the flow of the working fluid and generate a damping force. The damping force generating mechanism 231A is disposed on the second chamber 20 side of the piston body 32A.

In such a second embodiment, a piston body 32A having a passage 76A communicating with the passage 41 is provided on the second chamber 20 side of the piston body 31. Therefore, the degree of freedom in design of the damping force generating mechanism 231A can be enhanced.

Third Embodiment

Next, a third embodiment will be described mainly with reference to FIG. 5 to FIG. 8, focusing on differences from the first embodiment. The parts common to the first embodiment are denoted by the same nomenclature and the same reference numerals.

A piston 12 of the third embodiment has a substantially disc-like piston body 331 (first piston body), a piston body 32 (second piston body) substantially similar to the piston body 32 of the first embodiment, and a piston body 32C (third piston body) which is a part common to the piston body 32. The piston body 32 is disposed on the side of the first chamber 19 of the piston body 331 and has a thickness in the axial direction thinner than that of the piston body 331. The piston body 32C is disposed on the side of the second chamber 20 of the piston body 331. In the piston bodies 331 and 32, the coupling surface 331a and the coupling surface 32a are coupled in a surface alignment state. In the piston bodies 331 and 32C, the coupling surface 331c and the coupling surface 32Ca are coupled in a surface alignment state. The coupling surface 331a is an end surface of the piston body 331 on the side of the piston body 32 and a surface orthogonal to the central axis of the piston body 331. The coupling surface 331c is an end surface of the piston body 331 on the piston body 32C side and a surface orthogonal to the central axis of the piston body 331. The piston 12 of the third embodiment includes piston bodies 331 and 32 coupled with each other at their coupling surfaces 331a and 32a, and piston bodies 331 and 32C coupled with each other at coupling surfaces 331c and 32Ca. Further, the piston body 331 is integrally formed by sintering.

The sliding contact member 33 is mounted on the outer circumferential surface 331b of the piston body 331. The sliding contact member 33 is mounted at an intermediate position of the piston body 331 in the axial direction. A part of the outer circumferential surface 331b of the sliding contact member 33 on the coupling surface 331a side is exposed to the first chamber 19 and a part of the outer circumferential surface 331b of the sliding contact member 33 on the coupling surface 331c side is exposed to the second chamber 20.

At the center of the piston body 331 in the radial direction, an insertion hole 335 is formed to penetrate in the axial direction. The attachment shaft portion 26 of the piston rod 13 is inserted through the insertion hole 335 with no gap. Further, a passage 341 (first passage), a passage 342 (second passage), an annular passage 343, and an annular passage 361 (first annular passage) are formed in the piston body 331. The passages 341 and 342 extend in the axial direction of the piston body 331 outside the radial insertion hole 335. The annular passage 343 extends over the entire circumference of the piston body 331 at the end portion on the coupling surface 331c side in the axial direction. The annular passage 361 extends over the entire circumference of the piston body 331 at the end portion on the coupling surface 331a side in the axial direction. The passage 341 and the passage 342 have point-symmetrical shapes with respect to the center of the piston body 331. In the annular passages 343 and 361, the width and position of the piston body 331 in the radial direction are the same, and the depth is also the same. The entire piston body 331 has a point-symmetrical shape with respect to the center thereof. The coupling surfaces 331a and 331c of the piston body 331 have the same shape. The piston body 331 has a shape that is not distinguished between the front side and the back side. That is, when the attachment shaft portion 26 is inserted into the insertion hole 335, the piston body 331 has no directionality in mounting.

Figure 6:
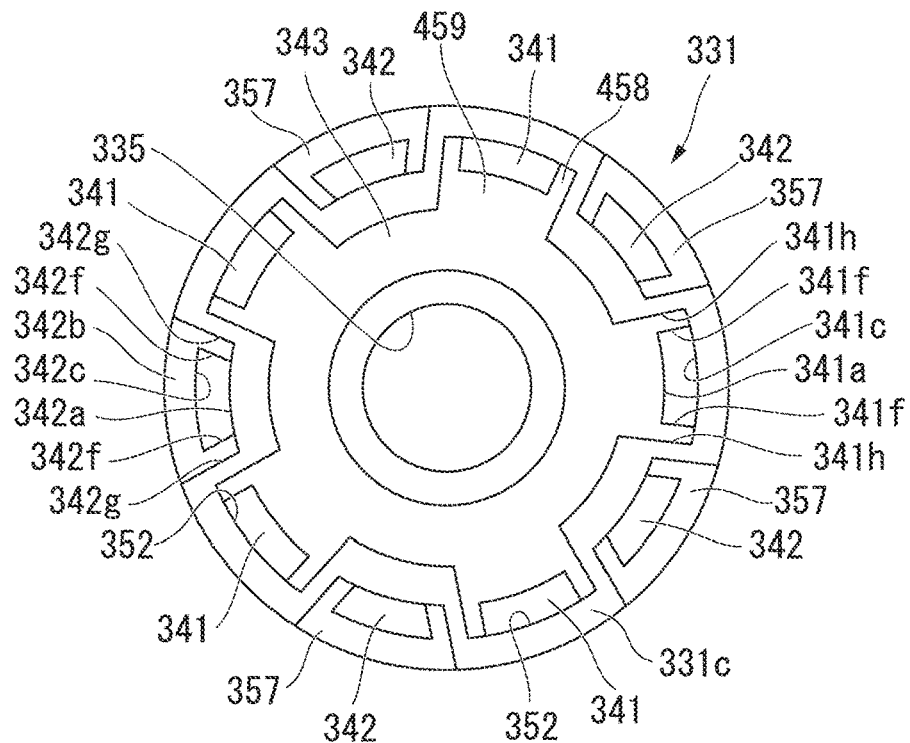
FIG. 6 is a plan view of a piston body (first piston body) of a fluidic damper according to the third embodiment of the present invention.
Figure 7:
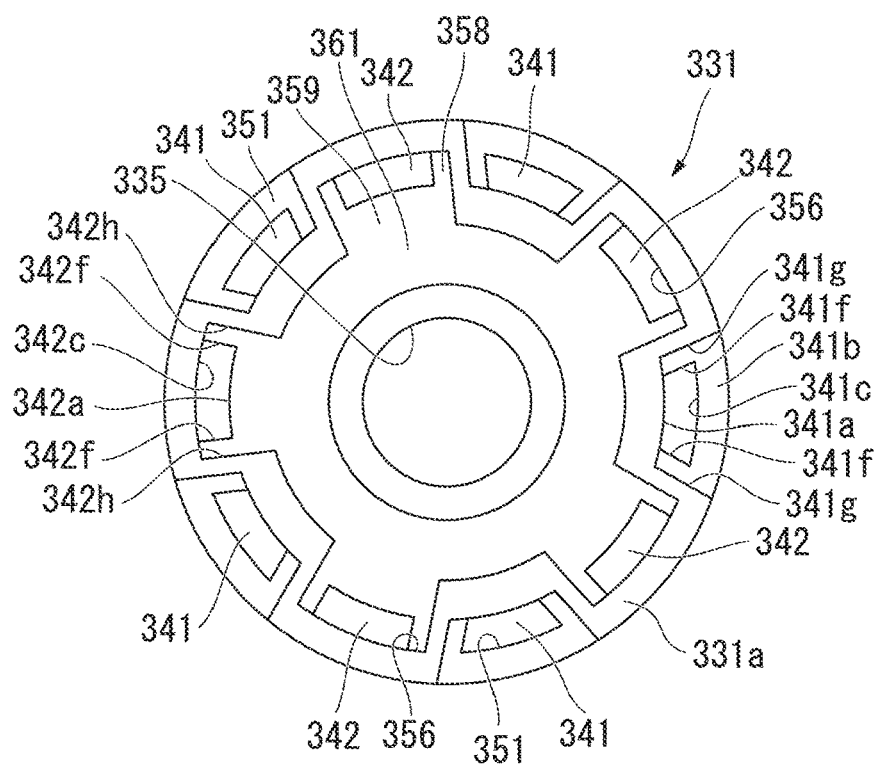
FIG. 7 is a bottom view of a piston body (first piston body) of the fluidic damper according to the third embodiment of the present invention.

As illustrated in FIGS. 6 and 7, the plurality of passages 341 are formed in the piston body 331 at intervals in the circumferential direction. The plurality of passages 342 are also formed in the piston body 331 at intervals in the circumferential direction. The passages 341 and the passages 342 are alternately disposed in the circumferential direction of the piston body 331. The annular passage 343 illustrated in FIG. 6 is formed to connect all the plurality of passages 341. The annular passage 361 illustrated in FIG. 7 is formed to connect all the plurality of passages 342.

Figure 5:
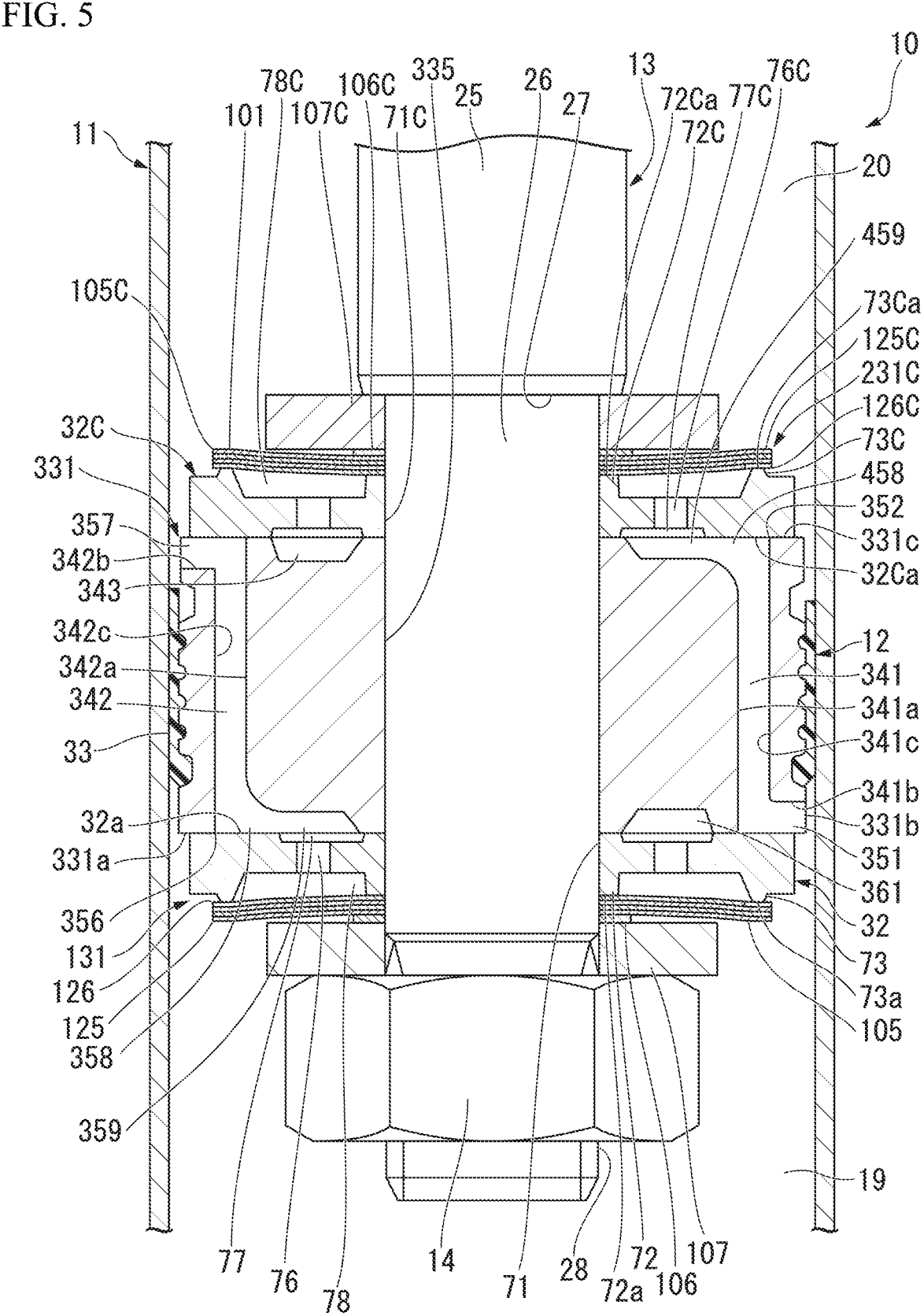
FIG. 5 is a partial cross-sectional view of a fluidic damper according to a third embodiment of the present invention.

As illustrated in FIG. 5, the passage 341 of the piston body 331 has an opening 351 (first opening) and an opening 352. The opening 351 opens to a coupling surface 331a with the piston body 32. The opening 352 opens to a coupling surface 331c with the piston body 32C. The opening 352 communicates with the annular passage 343. The opening 351 also opens to an outer circumferential surface 331b of the piston body 331 which is not covered with the sliding contact member 33. The opening 351 continuously opens from the coupling surface 331a to the outer circumferential surface 331b. The opening 351 always opens to the first chamber 19. The opening 352 opens only to the coupling surface 331c of the piston body 331 and does not open to the outer circumferential surface 331b.

The passage 341 has an inner wall surface 341a extending linearly in the axial direction on the inner side of the piston body 331 in the radial direction. The passage 341 has a radial surface 341b and an axial surface 341c on the outer side of the piston body 331 in the radial direction. The radial surface 341b is located on the coupling surface 331a side and is parallel to the coupling surface 331a. The axial surface 341c extends from the inner end edge portion of the radial surface 341b in the radial direction of the piston body 331 to the coupling surface 331c in the axial direction of the piston body 331.

As illustrated in FIGS. 6 and 7, the inner wall surface 341a and the axial surface 341c constitute a part of a cylinder centered on the central axis of the piston body 331. As illustrated in FIG. 7, the passage 341 has a pair of opposing surfaces 341f extending in the radial direction of the piston body 331 and facing each other in the circumferential direction of the piston body 331, and a pair of opposing surfaces 341g extending in the radial direction of the piston body 331 and facing each other in the circumferential direction of the piston body 331. The pair of opposing surfaces 341g are longer in the circumferential direction of the piston body 331 than the pair of opposing surfaces 341f. As illustrated in FIG. 6, the passage 341 has a pair of opposing surfaces 341h extending in the radial direction of the piston body 331 and facing each other in the circumferential direction of the piston body 331. The pair of opposing surfaces 341h are longer in the circumferential direction of the piston body 331 than the pair of opposing surfaces 341f. The passage 341 is formed by the inner wall surface 341a, the radial surface 341b, the axial surface 341c, the pair of opposing surfaces 341f, the pair of opposing surfaces 341g, and the pair of opposing surfaces 341h. As illustrated in FIG. 7, the inner wall surface 341a, the radial surface 341b, and the pair of opposing surfaces 341g form an opening 351, and as illustrated in FIG. 6, the axial surface 341c and the pair of opposing surfaces 341f form an opening 352 communicating with the annular passage 343.

As illustrated in FIG. 5, the passage 342 of the piston body 331 has an opening 356 similar to the opening 352, and an opening 357 similar to the opening 351. The opening 356 opens to the coupling surface 331a with the piston body 32. The opening 357 opens from the coupling surface 331c with the piston body 32C to the outer circumferential surface 331b. The opening 357 always opens to the second chamber 20. The opening 356 opens only to the coupling surface 331a of the piston body 31 and does not open to the outer circumferential surface 331b.

As illustrated in FIGS. 6 and 7, the passage 342 has an inner wall surface 342a similar to the inner wall surface 341a, a radial surface 342b similar to the radial surface 341b, an axial surface 342c similar to the axial surface 341c, a pair of opposing surfaces 342f similar to the pair of opposing surfaces 341f, a pair of opposing surfaces 342g similar to the pair of opposing surfaces 341g, and a pair of opposing surfaces 342h similar to the pair of opposing surfaces 341h. The passage 342 is formed by the inner wall surface 342a, the radial surface 342b, the axial surface 342c, the pair of opposing surfaces 342f, the pair of opposing surfaces 342g, and the pair of opposing surfaces 342h. The inner wall surface 342a, the radial surface 342b, and the pair of opposing surfaces 342g form an opening 357, and the axial surface 342c and the pair of opposing surfaces 342h form an opening 356 that communicates with the annular passage 361.

The annular passage 343 provided in the coupling surface 331c communicates with the opening 352 of the passage 341 and is separated from the opening 357 of the passage 342. The opening 351 of the passage 341 and the opening 356 of the passage 342 have a portion that opens on the same circle of constant width centered on the center of the piston body 331. A portion of the opening 356 of the passage 342 that opens to the same circle as the opening 351 of the passage 341 is the main opening portion 358. The main opening portion 358 is a range of the opening 356 on the outer side of the piston body 331 in the radial direction.

The opening 356 has the above-mentioned main opening portion 358 which opens in the same range as the opening 351 in the radial direction of the piston body 331, and an inner opening portion 359 which opens to the inner side in the radial direction from the main opening portion 358, that is, to the inner side in the radial direction from the opening 351. The inner opening portion 359 is a range of the opening 356 on the inner side in the radial direction of the piston body 331.

The annular passage 361 provided in the coupling surface 331a communicates with the opening 356 of the passage 342 and is separated from the opening 351 of the passage 341. The opening 357 of the passage 342 and the opening 352 of the passage 341 have a portion that opens to the same circle with a constant width centered on the center of the piston body 331. A portion of the opening 352 of the passage 341 that opens to the same circle as the opening 357 of the passage 342 is the main opening 458. The main opening 458 is a range of the opening 352 on the outer side of the piston body 331 in the radial direction.

The opening 352 has the above-described main opening portion 458 which opens in the same range as the opening 357 in the radial direction of the piston body 331, and an inner opening portion 459 which opens to the inner side in the radial direction from the main opening portion 458, that is, to the inner side in the radial direction from the opening 357. The inner opening 459 is a range of the opening 352 on the inner side of the piston body 331 in the radial direction.

As illustrated in FIG. 7, on the coupling surface 331a side of the piston body 331, an annular passage 361 is formed on the inner side in the radial direction from the opening 351 and on the outer side in the radial direction from the insertion hole 335. The annular passage 361 opens to the coupling surface 331a and is formed to traverse the opening 356 in a circumferential direction at a position communicating with the opening 356 of the passage 342. In other words, the annular passage 361 is formed between the insertion hole 335 of the piston body 331 and the inner wall surface 341a. The annular passage 361 is formed on the same circle centered on the center of the piston body 331. The annular passage 361 opens to the inner end position of the opening 356 in the radial direction of the piston body 331, that is, the inner end position of the inner opening portion 359.

As illustrated in FIG. 6, on the coupling surface 331c side of the piston body 331, an annular passage 343 is formed on the inner side in the radial direction from the opening 357 and on the outer side in the radial direction from the insertion hole 335. The annular passage 343 opens to the coupling surface 331c and is formed to traverse the opening 352 in a circumferential direction at a position communicating with the opening 352 of the passage 341 as illustrated in FIG. 6. In other words, the annular passage 343 is formed between the insertion hole 335 of the piston body 331 and the inner wall surface 342a. The annular passage 343 is formed on the same circle centered on the center of the piston body 331. The annular passage 343 opens to the inner end position of the opening 352 in the radial direction of the piston body 331, that is, the inner end position of the inner opening portion 459.

Figure 8:
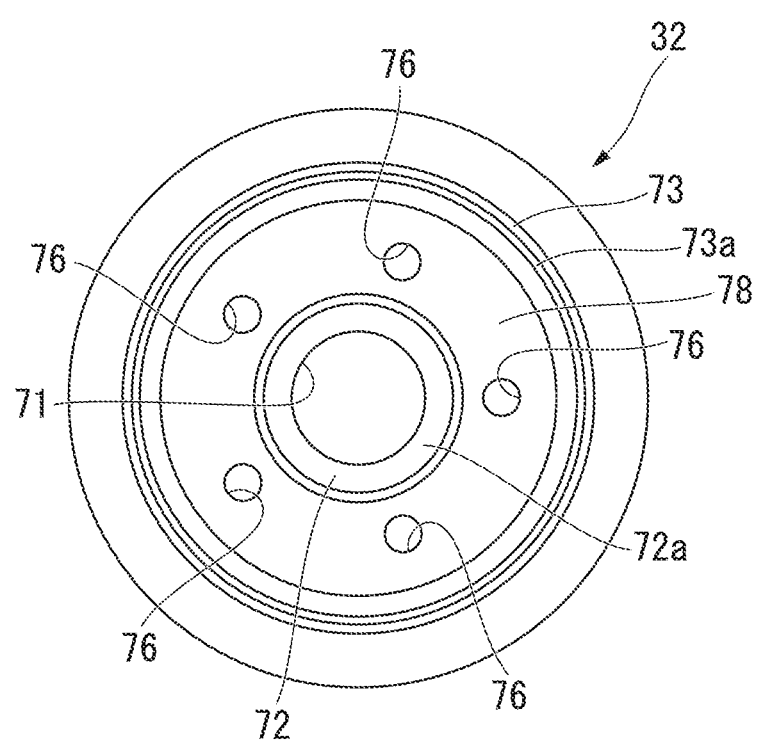
FIG. 8 is a plan view of a piston body (second piston body) of the fluidic damper according to the third embodiment of the present invention.

As illustrated in FIG. 5, in the piston body 32 of the third embodiment, the radial width of the annular passage 77 is wider than that of the first and second embodiments, and as illustrated in FIG. 8, the passage 76 is provided further outward in the radial direction than the first and second embodiments.

The piston bodies 331 and 32 are fitted to the attachment shaft portion 26 of the piston rod 13 in the insertion holes 335 and 71 to bring the coupling surfaces 331a and 32a into a surface alignment state. Then, in the radial direction, the outer circumferential position of the piston body 32 is disposed further outward than the outer end position of the opening 356 of the passage 342. This causes the piston body 32 to be coupled to the piston body 331 to prevent direct communication between the opening 356 of the passage 342 and the first chamber 19. Even when the piston body 32 is coupled to the piston body 331 as described above, since the opening 351 of the passage 341 of the piston body 331 has a shape in which the end portion on the side of the coupling surface 331a is extracted in the radially outward direction, the opening 351 always opens to the first chamber 19.

When the piston bodies 331 and 32 are in a coupled state, the plurality of passages 76 and annular passages 77 of the piston body 32 are disposed at the position of the annular passage 361 in the radial direction of the piston bodies 331 and 32. Thus, the passages 76 and the annular passages 77 always communicate with the inner opening 359 of the passage 342 and the annular passage 361.

The piston body 32C has an insertion hole 71C similar to the insertion hole 71, an inner seat 72C similar to the inner seat 72, an outer seat 73C similar to the outer seat 73, and an annular passage 78C similar to the annular passage 78. The inner seat 72C has a seat surface 72Ca similar to the seat surface 72a, and the outer seat 73C has a seat surface 73Ca similar to the seat surface 73a.

The piston bodies 331 and 32C are fitted to the attachment shaft portion 26 of the piston rod 13 at the insertion holes 335 and 71C to bring the coupling surfaces 331c and 32Ca into a surface alignment state. Then, in the radial direction, the outer circumferential position of the piston body 32C is disposed further outward than the outer end position of the opening 352 of the passage 341. As a result, the piston body 32C is coupled to the piston body 331 to prevent direct communication between the opening 352 of the passage 341 and the second chamber 20. Even when the piston body 32C is coupled to the piston body 331 as described above, the opening 357 of the passage 342 of the piston body 331 has a shape in which the end portion on the coupling surface 331c side is extracted in the radially outward direction, and the opening 357 always opens to the second chamber.

The piston body 32C has a passage 76C (fourth passage) similar to the passage 76, and an annular passage 77C similar to the annular passage 77. When the piston bodies 331 and 32C are coupled, the plurality of passages 76C and the annular passage 77C are disposed at the position of the annular passage 343 in the radial direction of the piston bodies 331 and 32C. Thus, the inner opening portion 459 of the passage 341 and the annular passage 343 always communicate with each other.

On the side of the second chamber 20 in the axial direction of the piston body 32C, in order from the side of the piston body 32C in the axial direction, a disc 105C similar to the disc 105, a spacer 106C similar to the spacer 106, and a regulating member 107C similar to the regulating member 107 are provided.

The disc 105C is formed by laminating a plurality of unit discs 125C similar to the unit disc 125. A fixed orifice 126C similar to the fixed orifice 126 is formed in the unit disc 125C which abuts on the seat surface 73Ca.

When the piston rod 13 moves to the extension side which increases the protrusion amount from the cylinder 11, the pressure of the second chamber 20 becomes higher than the pressure of the first chamber 19 due to the piston 12 that moves together with the piston rod 13. Then, the pressure is introduced into the plurality of passages 342 from the constantly open opening 357 and acts on the disc 105 via the annular passages 361 and 77, the plurality of passages 76 and the annular passage 78. Then, the disc 105 is separated from the outer seat 73 to open the annular passage 78. As a result, the working fluid flows from the second chamber 20 to the first chamber 19, via a plurality of passages 342, the annular passages 361 and 77, a plurality of passages 76, and the annular passage 78, at a flow rate according to the valve opening amount of the disc 105 and the outer seat 73. That is, in the plurality of passages 342, the annular passages 61 and 77, the plurality of passages 76 and the annular passage 78, when the piston rod 13 moves to the extension side and the piston 12 slides inside the cylinder 11 integrally with the piston rod 13, the working fluid flows from the second chamber 20 toward the first chamber 19 due to the sliding movement.

The annular outer seat 73 protruding from the piston body 32 to surround the annular passage 78 and the disc 105 which opens and closes the first chamber 19 side of the annular passage 78 constitute a damping force generating mechanism 131 of the extension side. The damping force generating mechanism 131 of the extension side is provided for the plurality of passages 342, the annular passages 361 and 77, the plurality of passages 76, and the annular passage 78 to suppress the flow of the working fluid and generate the damping force. The damping force generating mechanism 131 is disposed on the side of the first chamber 19 of the piston body 32.

When the piston rod 13 moves to the compression side which reduces the amount of protrusion from the cylinder 11, the pressure in the first chamber 19 becomes higher than the pressure in the second chamber 20 due to the piston 12 moving together with the piston rod 13. Then, the pressure is introduced into the plurality of passages 341 through the constantly open opening 351 and acts on the disc 105C via the annular passages 343 and 77C, the plurality of passages 76C and the annular passage 78C. Then, the disc 105C is separated from the outer seat 73C to open the annular passage 78C. As a result, the working fluid flows from the first chamber 19 to the second chamber 20 via the plurality of passages 341, the annular passages 343 and 77C, the plurality of passages 76C and the annular passage 78C, at a flow rate according to the valve opening amount of the disc 105C and the outer seat 73C.

The annular outer seat 73C protruding from the piston body 32C to surround the annular passage 78C and the disc 105C which opens and closes the second chamber 20 side of the annular passage 78C constitute a damping force generating mechanism 231C of the compression side. The damping force generating mechanism 231C of the compression side is provided for the plurality of passages 341, the annular passages 343 and 77C, the plurality of passages 76C and the annular passage 78C to suppress the flow of the working fluid and generate the damping force. The damping force generating mechanism 231C is disposed on the second chamber 20 side of the piston body 32C.

According to the third embodiment, since the piston body 331 has a point-symmetrical shape with respect to the radial direction and the axial center of the piston body 331, when the attachment shaft portion 26 is inserted into the insertion hole 335, there is no directionality for attachment. Therefore, the assembling is facilitated. Further, since the piston bodies 32 and 32C are common parts of the same shape, distinction is not required for the attachment. Therefore, the assembling is facilitated.

Fourth Embodiment

Figure 9:
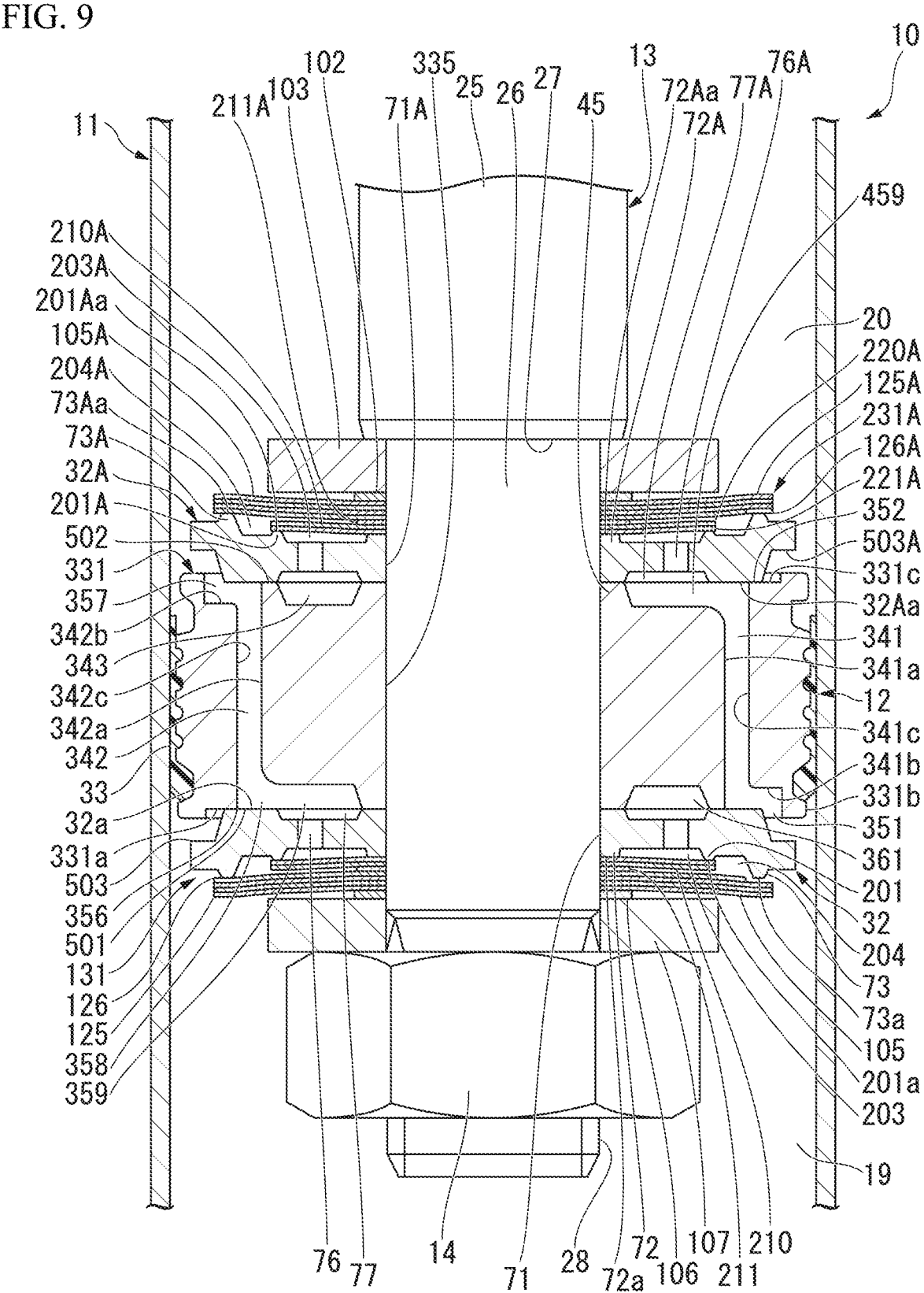
FIG. 9 is a partial cross-sectional view of a fluidic damper according to a fourth embodiment of the present invention.

Next, the fourth embodiment will be mainly described with reference to FIG. 9 focusing on differences from the first to third embodiments. The parts common to the first to third embodiments are denoted by the same nomenclature and the same reference numerals.

In the piston body 331 of the fourth embodiment, a recess 501 is formed on one side in the axial direction of the piston body 331 of the third embodiment, and a recess 502 is formed on the other side in the axial direction. The bottom surface of the recess 501 serves as a coupling surface 331a, and the bottom surface of the recess 502 serves as a coupling surface 331c. The entire piston body 331 of the fourth embodiment has a point-symmetrical shape with respect to the center thereof and is integrally formed by sintering.

In the piston body 32 of the fourth embodiment, an annular notch 503 is formed on the outer circumferential portion on the side opposite to the inner seat 72 and the outer seat 73 in the axial direction of the piston body 32 of the second embodiment illustrated in FIG. 4. A coupling surface 32a is formed on the inner side in the radial direction of the notch 503.

Further, the piston body 32A of the fourth embodiment has an annular notch 503A formed on the outer circumferential portion on the side opposite to the inner side seat 72A and the outer side seat 73A of the piston body 32A of the second embodiment illustrated in FIG. 4. A coupling surface 32Aa is formed on the inner side in the radial direction of the notch 503A. The piston bodies 32 and 32A of the fourth embodiment are common parts having the same shape.

The piston body 32 enters the recess 501 of the piston body 331, and the coupling surface 331a and the coupling surface 32a are in the surface alignment state. In this state, the piston bodies 331 and 32 are coupled to each other.

The piston body 32A enters the recess 502 of the piston body 331, and the coupling surface 331c and the coupling surface 32Aa are in the surface alignment state. In this state, the piston bodies 331 and 32A are coupled to each other.

According to the fourth embodiment, the piston body 32 enters the recess 501 of the piston body 331, and the coupling surface 331a and the coupling surface 32a are in the surface alignment state. Further, the piston body 32A enters the recess 502 of the piston body 331, and the coupling surface 331c and the coupling surface 32Aa are in the surface alignment state. Therefore, it is possible to shorten the axial length of the piston 12 including the piston bodies 331, 32, and 32A.

Fifth Embodiment

Figure 10:
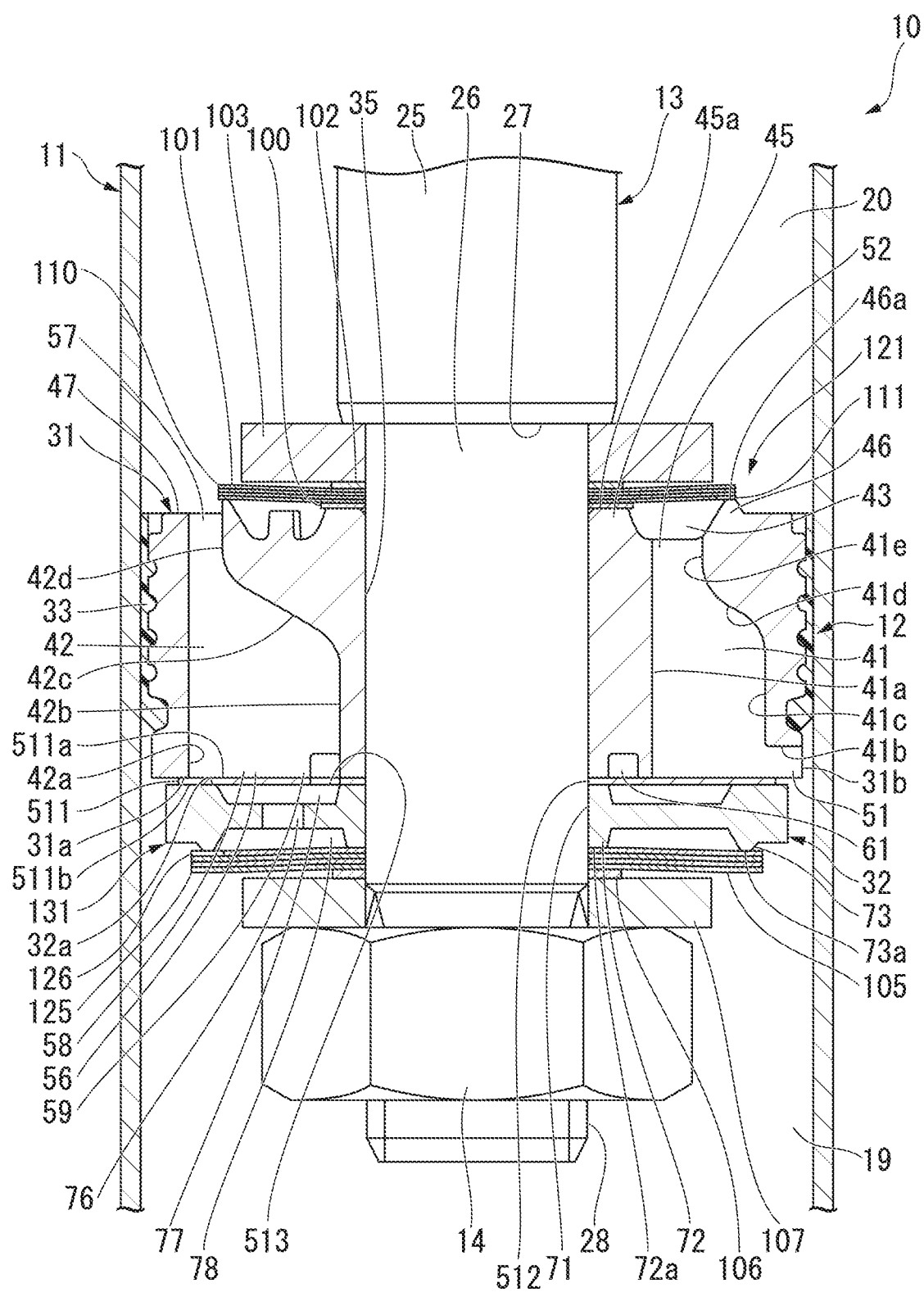
FIG. 10 is a partial cross-sectional view of a fluidic damper according to a fifth embodiment of the present invention.
Figure 11:
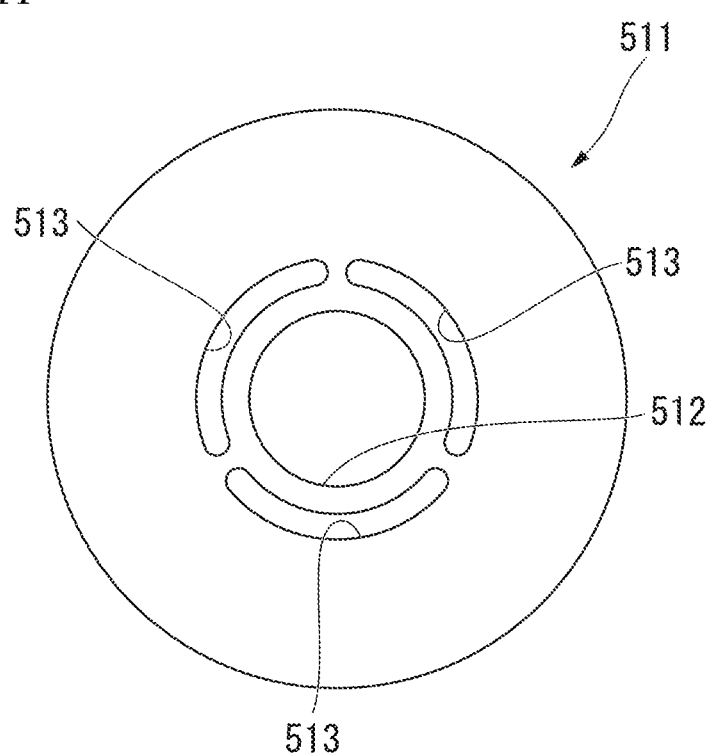
FIG. 11 is a plan view of a piston body (second piston body) of a fluidic damper according to the fifth embodiment of the present invention.

Next, a fifth embodiment will be described mainly with reference to FIG. 10 and FIG. 11 focusing on differences from the first embodiment. The parts common to the first embodiment are denoted by the same nomenclature and the same reference numerals.

In the fifth embodiment, the annular passage 77 of the piston body 32 has a size which enables the communication between the first passage 41 and the second passage 42 in the radial direction of the piston body 32. A disc-shaped piston body 511 (second piston body) is provided between the piston body 31 and the piston body 32. An insertion hole 512 through which the attachment shaft portion 26 of the piston rod 13 is inserted with no gap is formed in the piston body 511 to penetrate in the axial direction at the center position in the radial direction. Further, in the piston body 511, a plurality of passages 513 (third passages) are formed around the insertion hole 512 to penetrate in the axial direction as illustrated in FIG. 11. The piston body 511 has a mirror-plane symmetrical shape in the axial direction. As illustrated in FIG. 10, the piston body 31 is coupled to the piston body 511 in the state in which the coupling surface 31a thereof is aligned with the coupling surface 511a on one side of the piston body 511 in the axial direction. The piston body 32 is coupled to the piston body 511 in a state in which the coupling surface 32a thereof is aligned with the coupling surface 511b on the other side of the piston body 511 in the axial direction. In the piston body 511, the passage 513 brings the passage 42 and the annular passage 77 in communication with each other, and blocks communication between the passage 41 and the annular passage 77.

In the fifth embodiment, since it is possible to widen the radial width of the annular passage 77 of the piston body 32, the weight can be reduced.

The above embodiment illustrates an example in which the present invention is applied to a single cylinder type fluidic damper, but the present invention is also applicable to a double cylinder type fluidic damper provided with an outer cylinder forming a reservoir chamber therebetween on the outer periphery of a cylinder, and the present invention is also applicable to all the fluidic dampers.

The above-described embodiment includes a cylinder in which a working fluid is sealed, a piston slidably provided in the cylinder to partition the interior of the cylinder into a first chamber and a second chamber, and a piston rod connected to the piston and having one end extending to the outside of the cylinder. The piston includes a first piston body and a second piston body that are coupled to each other at a coupling surface. The damping force generating mechanisms are disposed on the second chamber side of the first piston body and the first chamber side of the second piston body. The first piston body has a first passage which has a first opening that opens to the first chamber on the coupling surface with the second piston body and extends in the axial direction, and a second passage which has a second opening on the coupling surface with the second piston body, extends in the axial direction and has a third opening that opens to the second chamber. The second piston body is coupled to the first piston body to prevent direct communication between the second opening and the first chamber. The second opening has an inner opening portion that opens further inward in the radial direction than the first opening. The inner opening portion communicates with a third passage formed in the second piston body. Even if positions in the circumferential direction of the first piston body and the second piston body are not aligned, it is possible to allow the second passage and the third passage to communicate with each other, without communication between the first passage and the third passage. Therefore, a circumferential positioning unit is not necessary for the first piston body and the second piston body, and a positioning work in the circumferential direction is not necessary in the assembling work. Further, since a positioning convex portion in the circumferential direction is not required, it is applicable to an automatic component feeder. In addition, since the first passage and the second passage extend in the axial direction, it is not necessary to form the first and second passages by cutting. Therefore, manufacturing costs can be reduced.

Further, since the first opening and the second opening have a portion which is opened on the same circle, the passage can be opened in a straight line shape.

Further, since the first annular passage is formed on the inner side in the radial direction of the first opening of the first piston body and at a position communicating with the second opening, it is possible to allow the second passage and the third passage to communicate with each other without increasing the number of the third passages.

Further, since the second annular passage is formed at a position at which the second piston body communicates with the inner opening, it is possible to allow the second passage and the third passage to communicate with each other without increasing the number of the third passages.

In addition, since the third piston body having the fourth passage communicating with the first passage is provided on the second chamber side of the first piston body, the design flexibility of the damping force generating mechanism can be enhanced.

Further, since the outer shape of the second piston body is circular, manufacturing is facilitated and the cost can be reduced.

In addition, a plurality of first openings and second openings are provided, and the first openings and the second openings are alternately disposed.

INDUSTRIAL APPLICABILITY

According to the aforementioned fluidic damper, it is possible to reduce the cost of the fluidic damper.

REFERENCE SIGNS LIST

10 Fluidic damper
11 Cylinder
12 Piston
13 Piston rod
19 First chamber
20 Second chamber
31 Piston body (first piston body)
31a, 32a Coupling surface
32 Piston body (second piston body)
32A Piston body (third piston body)
32C Piston body (third piston body)
41 Passage (first passage)
42 Passage (second passage)
51 Opening (first opening)
56 Opening (second opening)
57 Opening (third opening)
59 Inner opening
61 Annular passage (first annular passage)
76 Passage (third passage)
76A Passage (fourth passage)
76C Passage (fourth passage)
77 Annular passage (second annular passage)
121, 131, 231, 231 Damping force generating mechanism
331 Piston body (first piston body)
341 Passage (first passage)
342 Passage (second passage)
361 Annular passage (first annular passage)
511 Piston body (second piston body)

The invention claimed is:
1. A fluidic damper comprising:
a cylinder in which a working fluid is sealed;
a piston slidably provided in the cylinder to partition the interior of the cylinder into a first chamber and a second chamber; and
a piston rod connected to the piston and having one end extending to the outside of the cylinder,
wherein the piston includes a first piston body and a second piston body coupled to each other at a coupling surface,
damping force generating mechanisms are disposed on the second chamber side of the first piston body and the first chamber side of the second piston body,
the first piston body includes a first passage which has a first opening that opens to the first chamber in the coupling surface with the second piston body and extends in an axial direction, and a second passage which has a second opening on the coupling surface with the second piston body, extends in the axial direction and has a third opening that opens to the second chamber,
the second piston body is coupled to the first piston body to prevent direct communication of the first chamber with the second opening,
the second opening has an inner opening portion that opens further inward in a radial direction than the first opening, the inner opening portion communicating with a third passage formed in the second piston body, and
a first annular passage is formed further inward in the radial direction than the first opening of the first piston body and at a position communicating with the second opening,
the first passage has a first axial surface and the second passage has a second axial surface,
the second axial surface is located further inward in the radial direction than a position of the first axial surface,
the third passage is formed in plurality in the second piston body at positions further inward in the radial direction than a position corresponding to the first axial surface,
the first opening opens radially to an outer circumferential surface of the first piston body, thereby the first passage is always in communication with the first chamber irrespective of a relative positional relationship between the first piston body and the second piston body,
the first passage and the third passages are configured not to communicate with each other,
the third passages are provided at a position in the radial direction corresponding to that of the first annular passage, thereby the third passages are always in communication with the second passage, and the first axial surface of the first passage and the second axial surface of the second passage are configured to each include a portion that is parallel to a central axis of the first piston body, and that is a substantial length of the overall length of the first passage and the second passage.

2. The fluidic damper according to claim 1, wherein the first opening and the second opening have a portion which opens on a same circle.

3. The fluidic damper according to claim 1, wherein a second annular passage is formed at a position at which the second piston body communicates with the inner opening portion.

4. The fluidic damper according to claim 1, wherein an outer shape of the second piston body is circular.

5. The fluidic damper according to claim 1, wherein a plurality of the first openings and the second openings are provided, and the first openings and the second openings are alternately disposed.

6. A fluidic damper comprising:
a cylinder in which a working fluid is sealed;
a piston slidably provided in the cylinder to partition the interior of the cylinder into a first chamber and a second chamber; and
a piston rod connected to the piston and having one end extending to the outside of the cylinder,
wherein the piston includes a first piston body and a second piston body coupled to each other at a coupling surface,
a first damping force generating mechanism is disposed on the second chamber side of the first piston body,
a second damping force generating mechanism is disposed on the first chamber side of the second piston body,
the first piston body includes a first passage which has a first opening that opens to the first chamber on the coupling surface with the second piston body and extends in an axial direction, and a second passage which has a second opening on the coupling surface with the second piston body, extends in the axial direction and has a third opening that opens to the second chamber,
the second piston body is coupled to the first piston body to prevent direct communication of the first chamber with the second opening,
the second opening has an inner opening portion that opens further inward in a radial direction than the first opening, the inner opening portion communicating with a third passage formed in the second piston body,
a third piston body having a fourth passage communicating with the first passage is provided on the second chamber side of the first piston body,
the first piston body is formed with a first annular passage and a second annular passage,
the third passage is disposed at a position corresponding to the first annular passage,
the fourth passage is disposed at a position corresponding to the second annular passage,
the first annular passage is configured by a first annular groove provided on a first end surface of the first piston body on a side closer to the first chamber,
the second annular passage is configured by a second annular groove provided on a second end surface of the first piston body on a side closer to the second chamber,
the first annular groove that forms the first annular passage has a wall portion between the first annular groove and the piston rod, thereby the first annular groove is not provided with an opening portion that opens to the piston rod,
the second annular groove that forms the second annular passage has a wall portion between the second annular groove and the piston rod, thereby the second annular groove is not provided with an opening portion that opens to the piston rod,
the first passage communicates with the first damping force generation mechanism only through the fourth passage that communicates with the second annular passage,
the second passage communicates with the second damping force generation mechanism only through the third passage that communicates with the first annular passage, and
a first axial surface of the first passage and a second axial surface of the second passage are configured to each include a portion that is parallel to a central axis of the first piston body, and that is a substantial length of the overall length of the first passage and the second passage.

* * * * *